US010832255B2

(12) United States Patent
Coman et al.

(10) Patent No.: US 10,832,255 B2
(45) Date of Patent: Nov. 10, 2020

(54) SYSTEMS AND METHODS FOR UNDERSTANDING AND SOLVING CUSTOMER PROBLEMS BY EXTRACTING AND REASONING ABOUT CUSTOMER NARRATIVES

(71) Applicant: Capital One Services, LLC, McLean, VA (US)

(72) Inventors: Alexandra Coman, Tysons Corner, VA (US); Erik T. Mueller, Chevy Chase, MD (US); Margaret Mayer, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/786,883

(22) Filed: Feb. 10, 2020

(65) Prior Publication Data

US 2020/0320542 A1   Oct. 8, 2020

Related U.S. Application Data

(63) Continuation of application No. 16/376,985, filed on Apr. 5, 2019, now Pat. No. 10,558,982.

(51) Int. Cl.
*G06Q 30/00* (2012.01)
*G10L 17/00* (2013.01)
*G06Q 40/02* (2012.01)

(52) U.S. Cl.
CPC ......... *G06Q 30/016* (2013.01); *G06Q 40/025* (2013.01); *G10L 17/005* (2013.01)

(58) Field of Classification Search
USPC .................. 704/9, 1–504; 705/38, 35, 39
See application file for complete search history.

(56) References Cited

U.S. PATENT DOCUMENTS

| 5,940,811 | A | 8/1999 | Norris | |
|---|---|---|---|---|
| 6,209,095 | B1 * | 3/2001 | Anderson | G06Q 20/3674 713/176 |
| 7,395,239 | B1 * | 7/2008 | Riseman | G06Q 20/10 705/35 |

(Continued)

OTHER PUBLICATIONS

Riedl, M.O. et al, Narrative Planning: Balancing Plot and Character, Journal of Artificial Intelligence Research 39, Sep. 2010.

(Continued)

*Primary Examiner* — Marcus T Riley
(74) *Attorney, Agent, or Firm* — Troutman Pepper Hamilton Sanders LLP; Christopher Forstner; John Morrissett

(57) ABSTRACT

Consistent with the disclosed embodiments, systems and methods are provided herein for autonomously responding to customer problems. In one example implementation, a system performing a method is provided. The system may receive a customer utterance associated with a customer and define, based on the customer utterance, a first customer narrative comprising a first customer goal. The system may also determine whether the first customer narrative is sufficient to identify a first customer problem corresponding to at least a first problem of a plurality of problems. Responsive to determining that the first customer narrative is sufficient, the system may identify a first response corresponding with the first problem. The system may also customize the first response for the customer based on at least the first customer narrative, and execute the customized response.

22 Claims, 10 Drawing Sheets

(56) References Cited

U.S. PATENT DOCUMENTS

| | | | | |
|---|---|---|---|---|
| 8,346,563 | B1* | 1/2013 | Hjelm | G10L 15/1822 |
| | | | | 379/88.01 |
| 10,074,089 | B1* | 9/2018 | Rangaraj | G10L 17/06 |
| 10,558,982 | B1* | 2/2020 | Coman | G06Q 30/016 |
| 2001/0037287 | A1* | 11/2001 | Broadbent | G06Q 20/10 |
| | | | | 705/38 |
| 2006/0129478 | A1* | 6/2006 | Rees | G06Q 40/02 |
| | | | | 705/38 |
| 2017/0337605 | A1* | 11/2017 | Codella | G06Q 30/0611 |

OTHER PUBLICATIONS

Goyal, A. et al., A Computational Model for Plot Units, Computational Intelligence, vol. 00, No. 0, 2012.

Niehaus, J. et al., Cognitive models of discourse comprehension for narrative generation, Literary and Linguistic Computing, vol. 29, No. 4, Oct. 13, 2014.

Marsella, S.C. et al., EMA: A process model of appraisal dynamics, Cognitive Systems Research, Jul. 5, 2008.

Fox, M. et al., Plan Stability: Replanning versus Plan Repair, International Conference on AI Planning and Scheduling (ICAPS), 2006.

Riedl, M.O., Computational Narrative Intelligence: A Human-Centered Goal for Artificial Intelligence, CHI'16 Workshop on Human-Centered Machine Learning, May 8, 2016.

Dias J. et al, FAtiMA Modular: Towards an Agent Architecture with a Generic Appraisal Framework, uploaded to Research Gate on Dec. 13, 2014 (originally published on Nov. 12, 2014, in Emotion Modeling. Lecture Notes in Computer Science, vol. 8750. Springer, Cham).

* cited by examiner

SYSTEMS AND METHODS FOR UNDERSTANDING AND SOLVING CUSTOMER PROBLEMS BY EXTRACTING AND REASONING ABOUT CUSTOMER NARRATIVES

CROSS REFERENCE TO RELATED APPLICATIONS

This application is a continuation of, and claims priority under 35 U.S.C. § 120 to, U.S. patent application Ser. No. 16/376,985, filed Apr. 5, 2019, the entire contents of which is fully incorporated herein by reference.

FIELD

The disclosed technology relates to systems and methods for extracting and reasoning about customer narratives, and more particularly autonomous systems and methods for identifying and responding to customer problems based on defining one or more customer narratives from the customer discourse.

BACKGROUND

Organizations that offer products and/or services have traditionally relied on customer service representatives to interact with customers. Call centers staffed with human representatives can provide certain advantages, particularly for customers who wish to speak to a human. However, such staffing can be cost-prohibitive for the organization and often results in inefficient account servicing with substantial wait times for customers. To reduce cost and increase account servicing efficiency, many organizations use interactive voice response (IVR) systems or programs that generate automatic written, auditory, or video responses via web and/or mobile device application channels. Such systems can provide customers with requested information and perform routine account actions without having to maintain a large workforce of customer service agents. While cost effective, existing computerized customer interaction systems tend to provide an impersonal and robotic user experience, limited by scripted questions and responses, and can require a cumbersome authorization process for each customer-service session.

Accordingly, there is a need for improved systems and methods to provide efficient and cost-effective customer interaction systems. Embodiments of the present disclosure are directed to this and other considerations.

SUMMARY

Disclosed herein are systems and methods for autonomously identifying and responding to customer problems. Consistent with the disclosed embodiments, a system is provided for autonomously identifying and responding to customer problems. The system includes one or more processors and memory in communication with the one or more processors and storing instructions that, when executed by the one or more processors, cause the system to perform one or more steps of a method for responding to customer problems. The system may receive a customer utterance (which may include (1) information pertaining to a customer goal identifiable by the system, which the customer service system may fulfill or help fulfill, and (2) information that does not directly pertain to a goal that the customer service system can help with (e.g., the customer can share a story about his/her childhood that doesn't include a goal identifiable by the customer service system)) from a user device associated with a customer. The system may extract a customer narrative from the customer utterance. The system may then attempt to extract one or more customer problems (which may include a current state of the customer and one or more customer goals) from the customer narrative (certain types of information in the customer narrative may be identified as being part of the current state (e.g., current customer emotional state), while others could be identified as being part of the goal). The system may determine whether one or more customer problems were extracted from the customer narrative. In response to determining that one or more customer problems were not extracted from the customer narrative, then the customer service system may generate a request for more information from the user device associated with the customer. In response to determining that the one or more customer problems were extracted from the customer narrative, the system may generate a first solution to the one or more customer problems and execute the generated first solution. The system may also synthesize a first system response based on the customer narrative, the generated first solution, a result of the executed first solution, and the request for more information. The system may also send the first system response to the user device associated with the customer. The system may receive an additional customer utterance. The system may determine whether the additional customer utterance includes a close conversation request (e.g., an indication that the customer wants to terminate the conversation with the customer service system (e.g., simply stating "goodbye")). In response to determining that the customer utterance includes a close conversation request or that the user device has disconnected from the system, the customer service system terminates interaction with the user device. In response to determining that the first additional customer utterance does not comprise the close conversation request, the system may update the customer narrative based on the additional customer utterance (e.g., based on the additional customer utterance, the system might add to the customer narrative events, temporal ordering, causal links, and other components as more details of the customer narrative become available).

Consistent with the disclosed embodiments, another system is provided for autonomously identifying and responding to customer problems. The system includes one or more processors and memory in communication with the one or more processors and storing instructions that, when executed by the one or more processors, cause the system to perform one or more steps of a method for responding to customer problems. The system may receive a customer utterance associated with a customer and determine whether the customer utterance includes sufficient customer identification information (e.g., a first name, a last name, email and a date of birth). When the information in the customer utterance is assessed as insufficient (e.g., the customer utterance does not include a first name, a last name, and a date of birth), the system receives new customer utterances. When the information in the customer utterances is assessed as sufficient (e.g., the customer utterances include a first name, a last name, email, and a date of birth), the system may define, based on the customer utterances, a first customer narrative comprising a first customer goal. The system may determine whether the first customer narrative is sufficient to identify a first customer problem (e.g., does the first customer narrative include a first customer problem such as the customer wanting a car loan). When the first customer narrative is insufficient for this purpose (e.g., the first customer narrative does not include a first customer problem), the system may redefine the first customer narrative as a second customer narrative based on either (i) one or more prior customer interactions with the customer (e.g., interactions with the same customer that predate the customer utterance) or (ii) a lack of prior customer interactions. The system may assess whether the second customer narrative is sufficient. When the second (or $(n-1)^{th}$) customer narrative is insufficient (e.g., the second customer narrative does not include a first customer problem), the system may iteratively (i) provide follow-up system utterances to the customer in order to elicit additional information related to the first customer goal, (ii) receive the additional information, and (iii) redefine the second (or $(n-1)^{th}$) customer narrative as a third (or $n^{th}$) customer narrative based on the received additional information until the third (or $n^{th}$) customer narrative is determined to be sufficient to identify the first customer problem. When at least one customer narrative of the first customer narrative, the second customer narrative, and the third (or $n^{th}$) customer narrative is sufficient (e.g., when either the first, second, or third/$n^{th}$ customer narrative includes a first customer problem), the system may identify at least a first response corresponding with the first customer problem. The system may customize the first response for the customer based on a customer narrative (e.g., $1^{st}$, $2^{nd}$, $3^{rd}$, or $n^{th}$), and execute the customized first response.

Consistent with the disclosed embodiments, another system is provided for autonomously responding to customer problems. The system includes one or more processors and memory in communication with the one or more processors and storing instructions that, when executed by the one or more processors, cause the system to perform one or more steps of a method for responding to customer problems. The system may receive a customer utterance associated with a customer and define, based on the customer utterance, a first customer narrative comprising a first customer goal. The system may determine that the first customer narrative is sufficient to identify a first customer problem (e.g., the first customer narrative includes a first customer problem such as the customer wanting a car loan). Responsive to determining that the first customer narrative is sufficient for this purpose (e.g., when the first customer narrative includes a first customer problem), the system may identify a first response corresponding with the first customer problem. The system may customize the first response for the customer based on at least the first customer narrative and execute the customized response.

Consistent with the disclosed embodiments, another system is provided for autonomously responding to customer problems. The system includes one or more processors and memory in communication with the one or more processors and storing instructions that, when executed by the one or more processors, cause the system to perform one or more steps of a method for responding to customer problems. The system may receive a customer utterance associated with a customer and determine whether the customer utterance includes customer identification information. When the customer utterance does not include customer identification information, the system may provide one or more prompts to a user device associated with the customer to prompt the customer to provide the customer identification information. When the customer utterance includes customer identification information, the system may define, based on the customer utterance, a first customer narrative comprising a first customer goal. The system may determine whether the first customer narrative corresponds with or includes a first customer problem. When the first customer narrative does not correspond with or include the first customer problem, the system may iteratively (i) provide follow-up system utterances to the user device in order to elicit additional information related to the first customer goal, (ii) receive the additional information, and (iii) redefine the first customer narrative as a second customer narrative based on the received additional information until the second customer narrative is determined to be sufficient to identify the first customer problem. When at least one customer narrative of the first customer narrative and the second customer narrative corresponds with or includes the first customer problem, the system may identify at least a first response corresponding with the first customer problem. The system may customize the first response for the customer based on one or more of the first customer narrative and the second customer narrative and execute the customized first response.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
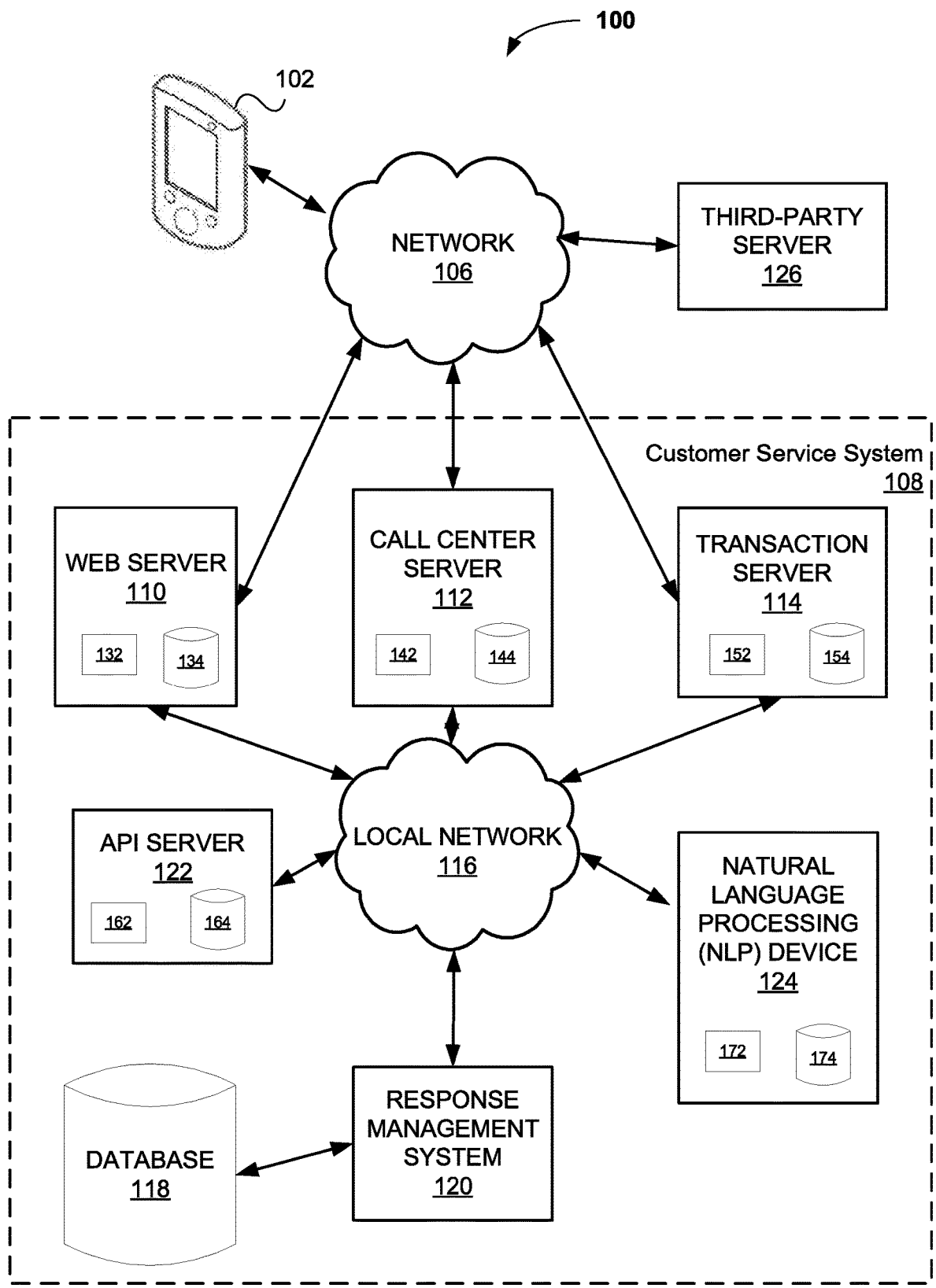
FIG. 1 is a block diagram of an example system 100 that may be used to autonomously identify and respond to customer problems.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems, it is contemplated that embodiments with identical or substantially similar features may alternatively be implemented as systems, methods and/or non-transitory computer-readable media.

The terms "story" and "narrative" are to be used interchangeably throughout this application.

According to certain example implementations of the disclosed technology, the term "dialogue" refers to information and/or communication received from a customer and/or provided to a customer as part of the interaction(s) between the customer and the response management system (e.g., an AI agent). In other words, "dialogue" is a two-way communication between the system and the customer. Dialogue includes customer utterances (i.e., an expression of a word or words (e.g., a phrase or a sentence)) transmitted to the system via email, messaging (e.g., text messaging), chat window, or phone call. Dialogue also includes messages (e.g., "What can I help you with?") from the system to elicit additional information from the customer or prompts (e.g., "Interesting, please go on.") to allow the customer to continue telling her story.

According to certain example implementations of the disclosed technology, the term "discourse" includes dialogue, one-way communication from the customer to the system, or some combination thereof. Like dialogue discourse described above, one-way communication discourse includes customer utterances. But unlike dialogue discourse, one-way communication discourse does not include messages to elicit additional information or prompts from the system to elicit additional information. Regardless of the type of discourse (dialogue or one-way or both), the customer may communicate with the system using certain communication channels (e.g., email, messaging, chat windows, phone calls) so that the customer may communicate textual, audible and/or video information. Described more below, the system may utilize customer history records and/or records of communications with human customer service representatives to provide additional context for the interaction with customer.

An artificial intelligent (AI) system (described below as a response management system 120) may produce a "customer narrative" from discourse received from the customer. "Customer narratives" may be based on one or more customer utterances from the received discourse summarized by the system. For example, below is sample dialogue between a customer (C) and a system (S):

1/C: "Did my last transaction go through?"
1/S: "I can certainly help you with that!"
2/C: "I really hope my transaction went through! I'm afraid of losing the llama-shaped rocking chair I ordered! It's sold out now."
2/S: "Have you wanted a rocking chair for a long time?"
3/C: "Not really. I just want it because it's llama-shaped. I love llamas, they remind me of my childhood."
3/S: "That sounds lovely, how come?"
4/C: "My grandparents used to own a few llamas. At first, I was terrified of them, but now they're my absolute favorites!"
4/S: "I'm so sorry, it does look like the transaction didn't go through. It was identified as potentially fraudulent."

Below is a sample of the customer narrative generated or built by the system at each step of the dialogue. Note that the customer narrative would be represented by the system in a formal manner, e.g., using a plan-based representation approach from the narrative intelligence research literature:

1/ The customer recently attempted a transaction.
2/ The customer recently attempted to purchase a llama-shaped rocking chair. She hopes the purchase was successful.
3/ The customer recently attempted to purchase a llama-shaped rocking chair. She hopes the purchase was successful. She loves llamas because they remind her of her childhood.
4/ The customer recently attempted to purchase a llama-shaped rocking chair. She hopes the purchase was successful. She loves llamas because they remind her of her childhood. The reason llamas remind her of her childhood is that her grandparents used to own a few llamas. Earlier, she was scared of them. Now, they are her favorite animals.

The system may reason using different types of reasoning (e.g., commonsense and social reasoning) while the system generates or builds the above model from the received dialogue. For example, after utterance 1, the system may immediately assume that the customer hopes their transaction was successful even before the customer says so. The system may identify the transaction in utterance 1 is the purchase of the llama-shaped rocking chair mentioned in utterance 2. There may be uncertainty at various levels including (1) whether the system understood what the customer said (at various levels of understanding), (2) whether the system's inferences and disambiguation are correct, (3) whether the customer is being sincere, and (4) whether the customer knows the actual facts.

The system may process customer narratives using narrative planning, which may be necessary for purposes including generating solution plans for banking-related customer problems and speculating about how a narrative might continue or what might have happened in a narrative before or between events that are known. Although it may not be feasible to have planning knowledge available for all possible narratives the customer might tell, such knowledge could be made available for limited conversation topics, such as banking-related ones.

The system may process customer narratives using emotional appraisal, which may be used to assess customers' emotions, moods, and attitudes when these are not directly expressed. For example, even if the customer had not mentioned it directly, the agent could have assumed, based on the general situation (i.e., the customer having attempted a purchase that may not have been successful of an item that is sold out) that the customer is experiencing hope and fear pertaining to their goal.

The system may process customer narratives using analogical reasoning to identify story patterns. The system may identify a partial negative pattern in the customer's story and attempt to stop it from being completed (e.g., prevent a story from ending in disappointment).

The system may process customer narratives using inferences to reason about a gap in a story. The inference may or may not be planning-based. This may be necessary due to the sparse nature of customer story content.

The knowledge representation approach for customer narratives may accommodate the following characteristics. (1) The customer is generally the central character. (2) Anything the customer says may be part of the customer narrative, even if what they say is not strictly in narrative form, e.g., if it is a direct expression of feelings or emotions (e.g., I love llamas! I'm really upset right now!"). The stories may fluctuate between high-level, broad strokes and highly-detailed, low-level sequences of actions such as "I'd never thought I'd like llamas, I'd always been terrified of them before. Anyway, here's what I did. I clicked on the button on the left, then I scrolled down the bottom of the page." Certain details may be related to the task at hand (e.g., "I clicked the button on the left."), others may not (e.g., "I'd never thought I'd like llamas, but now they're my absolute favorites!"). The former may be used to understand and solve the banking-specific problems that the customer contacted the system about, while the latter may provide information that leads to thoughtful acts and empathetic conversation. Certain events may have happened in the distant past (e.g., "As a child, I would . . . ."), while others may be recent and may have a sense of urgency associated with them (e.g., "I called, then I called again."). Also the timeframes of the stories may be long or brief, and the durations of actions and events are often of interest.

Stories may include complex causal links that may not be easily represented by an action's effects establishing preconditions for another action. For example, the customer may state that they like something because it acts as a cue for positive memories (e.g., "I like llamas. They remind me of my childhood."). Customer preferences and attitudes may be part of the story representation. They, too, may be included in the causality relationships (e.g., "I like llamas very much because they remind me of my childhood.", temporal progression (e.g., "I used to be terribly afraid of them, but then I started to like them"), and other narrative constructs.

The narrative representation approach may be one in which the following are all first-class elements: actions, events, states, goals, and emotions/feelings. Goal status may be: fulfilled, failed, in positive progress, or in negative progress. The system may establish causality and temporal links between any of the types of first-class elements (e.g., a temporal ordering between feelings: "I used to be terribly afraid of them, but then I started to like them"). Each element may be either directly expressed by the customer or inferred by the system. For example, emotions may be inferred from goal fulfillment of lack thereof.

According to certain example implementations of the disclosed technology, systems are disclosed herein for identifying and responding to customer problems based on non-interactive input and/or dialogue with the customer. For example, in one aspect, a system for autonomously identifying and responding to customer problems is provided. The system includes one or more processors and memory in communication with the one or more processors and storing instructions that, when executed by the one or more processors, cause the system to perform steps of a method. The instructions may cause the system to receive a customer utterance and the system may extract a customer narrative from the customer utterance. Customer utterances may include (1) information pertaining to a customer goal identifiable by the system, which the customer service system may fulfill or help fulfill, and (2) information that does not directly pertain to a goal that the customer service system can help with (e.g., the customer can share a story about his/her childhood that doesn't include a goal identifiable by the customer service system). The customer service system may extract a customer narrative from the customer utterance. The customer service system may then attempt to extract one or more customer problems from the customer narrative. The customer problem representation may include a current state of the customer and one or more customer goals. Certain types of information in the customer narrative may be identified as being part of the current state (e.g., current customer emotional state), while others could be identified as being part of the goal. The customer service system may determine whether one or more customer problems were extracted from the customer narrative. Put another way, the customer service system may determine whether one or more customer problems are identified in the customer narrative. If the customer service system extracts one or more customer problems from the customer narrative, the customer service system may send the one or more customer problems to its response management system (the customer service system's solver component). The response management system may include one or more planners, constraint satisfaction solvers, case-based reasoning systems, and/or other modules. If one or more customer problems are not extracted from the customer narrative, then the customer service system may generate a request for more information from the user device associated with the customer. The customer service system may determine whether the response management system generated a solution to the one or more customer problems. If the response management system generated one or more solutions to the one or more customer problems, the customer service system may optionally execute the generated solution. If the response management system fails to generate one or more solutions to one or more of the customer problems, the customer service system may generate a request for more information from the customer. The customer service system may synthesize a customer response based on the customer narrative, generated solution(s), results of any executed solution(s), and any request(s) for additional information. The customer service system may send the customer response to the user device associated with the customer. The customer service system 108 may receive an additional customer utterance. The customer service system determines whether the customer wishes to close the conversation based on his or her indication in the additional customer utterance. In other words, the customer service system determines whether the additional customer utterance includes a close conversation request (i.e., an indication that the customer wants to terminate the conversation with the customer service system (e.g., simply stating "goodbye")). If the customer service system determines that the customer utterance includes an indication that the customer wishes to close the conversation or if the customer has disconnected from the customer service system without sending an additional utterance, the customer service system terminates interaction with the user device associated with the customer. Otherwise, the customer service system may update the customer narrative based on the additional customer utterance. For example, the system might update the customer narrative based on the additional customer utterance by adding to the customer narrative events, temporal ordering, causal links, and other components as more details of the customer narrative become available. After updating the customer narrative, the customer service system may attempt to extract one or more customer problems from the updated customer narrative, or to update one or more previously extracted customer problems based on the customer narrative. The process continues until the customer closes the conversation.

In another aspect, another system for autonomously identifying and responding to customer problems is provided. The system may include one or more processors and memory in communication with the one or more processors and storing instructions that, when executed by the one or more processors, are configured to cause the system to perform steps of a method. The instructions may cause the system to receive an incoming customer utterance associated with a customer. The instructions may cause the system to determine whether the customer utterance includes sufficient customer identification information to identify the customer. The instructions may also cause the system to responsive to determining that the customer utterance does not include sufficient customer identification information (e.g., does not include first name, last name, email, and a date of birth) to identify the customer, iteratively prompting the customer for and receiving new incoming customer utterances associated with the customer until the new customer utterances include sufficient customer identification information (e.g., first name, last name, email, and a date of birth) to identify the customer. The instructions may also cause the system to, responsive to determining that the customer utterances include sufficient customer identification information (e.g., includes first name, last name, email, and a date of birth), define, based on the customer utterances, a first customer narrative including a first customer goal. The instructions may also cause the system to determine whether the first customer narrative is sufficient to identify a first customer problem. The instructions may also cause the system to, responsive to determining that the first customer narrative is insufficient for this purpose (e.g., the first customer narrative does not include a first customer problem), redefine the first customer narrative as a second customer narrative based on either (i) one or more prior customer interactions with the customer or (ii) a lack of prior customer interactions, each of the one or more prior customer interactions predating the customer utterance determine whether the second customer narrative is sufficient to identify the first customer problem, and responsive to determining that the second customer narrative is insufficient (e.g., the second customer narrative does not include a first customer problem), iteratively (i) provide follow-up system utterances to the first customer in order to elicit additional information related to the first customer goal, (ii) receive the additional information, and (iii) redefine the second (or $(n-1)^{th}$) customer narrative as a third (or $n^{th}$) customer narrative based on the received additional information until the third (or $n^{th}$) customer narrative is determined to be sufficient to identify the first customer problem (e.g., until the third/$n^{th}$ customer narrative includes the first customer problem). The instructions may also cause the system to, responsive to determining that at least one customer narrative of the first customer narrative, the second customer narrative, and the third (or $n^{th}$) customer narrative is sufficient to identify the first customer problem (e.g., where either one of the first customer narrative, the second customer narrative, and the third/$n^{th}$ customer narrative includes the first customer problem), identifying at least a first response corresponding with the first customer problem. The instructions may also cause the system to customize the first response for the customer based on at least one customer narrative of the first customer narrative, the second customer narrative, and the third (or $n^{th}$) customer narrative. The instructions may further cause the system to execute the customized first response.

In certain example implementations, the system further includes instructions that, when executed by the one or more processors, are configured to cause the system to determine an error associated with executing the first response, identify at least a second response corresponding with the first customer problem, and execute the second response.

In another aspect, another system for autonomously identifying and responding to customer problems is provided.

The system may include one or more processors and memory in communication with the one or more processors and storing instructions that, when executed by the one or more processors, are configured to cause the system to perform steps of a method. The instructions may cause the system to receive a customer utterance associated with a customer and define, based on the customer utterance, a first customer narrative including a first customer goal. The instructions may also cause the system to determine whether the first customer narrative is sufficient for this purpose (e.g., where the first customer narrative includes a first customer problem) to identify a first customer problem. The instructions may also cause the system to responsive to determining that the first customer narrative is sufficient to identify the first customer problem (e.g., the first customer narrative includes the first customer problem), identify a first response corresponding with the first customer problem. The instructions may also cause the system to customize the first response for the customer based on at least the first customer narrative. The instructions may further cause the system to execute the customized first response.

In certain example implementations, the system further includes instructions that, when executed by the one or more processors, are configured to cause the system to determine an error associated with executing the first response, identify at least a second response corresponding with the first customer problem, and execute the second response.

In yet another aspect, another system for autonomously identifying and responding to customer problems is provided. The system may include one or more processors and memory in communication with the one or more processors and storing instructions that, when executed by the one or more processors, are configured to cause the system to perform steps of a method. The instructions may cause the system to receive a customer utterance associated with a customer. The instructions may also cause the system to determine whether the customer utterance includes customer identification information. The instructions may also cause the system to, responsive to determining that the customer utterance includes customer identification information, define, based on the customer utterance, a first customer narrative including a first customer goal. The instructions may also cause the system to determine whether the first customer narrative corresponds with or includes a first customer problem. The instructions may also cause the system to, responsive to determining that the first customer narrative is insufficient for this purpose (i.e., does not include a recognizable problem), iteratively (i) provide follow-up system utterances to the customer in order to elicit additional information related to the first customer goal, (ii) receive the additional information, and (iii) redefine the first customer narrative as a second customer narrative based on the received additional information until the second customer narrative corresponds with or includes the first customer problem. The instructions may also cause the system to, responsive to determining that at least one customer narrative of the first customer narrative and the second customer narrative corresponds with or includes the first customer problem, identify at least a first response corresponding with the first customer problem. The instructions may also cause the system to customize the first response for the customer based on one or more of the first customer narrative and the second customer narrative. The instructions may further cause the system to execute the customized first response.

In certain example implementations, the system further includes instructions that, when executed by the one or more processors, are configured to cause the system to determine an error associated with executing the first response, identify at least a second response corresponding with the first customer problem, and execute the second response.

In certain example implementations, the system may execute instructions to conduct general dialogue with a customer until a customer narrative is defined. In some embodiments, to help develop the dialogue and to further develop the customer narrative, the system may, optionally, generate information-eliciting utterances to acquire relevant information to further develop the customer narrative.

In accordance with certain example implementations, the systems disclosed herein include a way to create value for organizations through better customer interaction. Certain example implementations of the disclosed technology may operate and interact with a customer without the need for a human customer service representative. Certain example implementations of the disclosed technology may be utilized in modern customer service settings, for example, in banking and/or other financial industries and settings.

A response may include any suitable response to the customer. For example, if the customer is seeking to obtain a personal loan, then the response may include sending the customer a personal loan application that is customized for them based on the customer narrative. Similarly, the response may include sending a link to an online preapproval application for a home loan to the customer via email and/or via a chat window.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system 100 that may be used to autonomously identify and respond to customer problems. The system 100 may be configured to perform one or more processes that can adaptively generate a response based on an ever-evolving customer context associated with customer interactions. The components and arrangements shown in FIG. 1 are not intended to limit the disclosed embodiments as the components used to implement the disclosed processes and features may vary. As shown, system 100 may include a user device 102 and a customer service system 108 configured to communicate over a network 106. The customer service system 108, or one or more components therein, may be configured to interact with the user device 102 to identify and respond to problems of the customer associated with the user device 102 as described herein. As shown, the customer service system 108 may include, for example, a web server 110, a call center server 112, a transaction server 114, a local network 116, a response management system 120, a database 118, an API server 122, and a natural language processing device 124 (which may be referred to herein as an NLP device).

In some embodiments, a customer may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of customer service system 108. In some embodiments, the user device 102 may include or incorporate electronic communication devices for hearing or vision impaired users. In certain example implementations, the user device 102 may belong to or be provided by a customer, or may be borrowed, rented, or shared. Customers may include individuals such as, for example, subscribers, clients, prospective clients, or customers of an entity associated with the customer service system 108, such as individuals who have obtained, will obtain, or may obtain a product, service, or consultation from an entity associated with the customer service system 108. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, Universal Serial Bus (USB), a Lightning™ connector, wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

The customer service system 108 may be associated with and optionally controlled by an entity such as a business, corporation, individual, partnership, or any other entity that provides one or more of goods, services, and consultations to individuals such as customers. The customer service system 108 may include one or more servers and computer systems for performing one or more functions associated with products and/or services that the customer service system 108 provides. Such servers and computer systems may include, for example, the web server 110, the call center server 112, and/or the transaction server 114, as well as any other computer systems necessary to accomplish tasks associated with the customer service system 108 or the needs of customers (which may be customers of the entity associated with the customer service system 108). The web server 110 may include a computer system configured to generate and provide one or more websites accessible to customers, as well as any other individuals involved in customer service system 108's normal operations. The web server 110 may include a computer system configured to receive communications from the user device 102 via for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the network 106) by one or more devices/systems (e.g., the response management system 120) of the system 100. In some embodiments, one or more processors 132 may be used to implement an automated natural language dialogue system that may interact with a customer via different types of communication channels such as a website, mobile application, instant messaging application, SMS message, email, or any other type of electronic communication. When receiving an incoming message from, for example, the user device 102 of a customer, the web server 110 may be configured to determine the type of communication channel the user device 102 used to generate the incoming message.

The call center server 112 may include a computer system configured to receive, process, and route telephone calls and other electronic communications between a customer operating a user device 102 and the response management system 120. The call center server 112 may have one or more processors 142 and one or more call center databases 144, which may be any suitable repository of call center data. Information stored in the call center server 112 may be accessed (e.g., retrieved, updated, and added to) via the local network 116 (and/or network 106) by one or more devices/systems (e.g., response management system 120) of the system 100. In some embodiments, the call center server processor 142 may be used to implement an interactive voice response (IVR) system that interacts with the customer over the phone.

The transaction server 114 may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with customer service system 108 provides to individuals such as customers. The transaction server 114 may have one or more processors 152 and one or more transaction server databases 154, which may be any suitable repository of transaction data. Information stored in transaction server 114 may be accessed (e.g., retrieved, updated, and added to) via the local network 116 (and/or network 106) by one or more devices (e.g., the response management system 120) of the system 100.

In some embodiments, the transaction server 114 tracks and stores event data regarding interactions between a third-party, such as a third-party server 126, with the customer service system 108, and on behalf of the individual customers. For example, the transaction server 114 may track third-party interactions such as purchase requests, refund requests, warranty claims, account withdrawals and deposits, and any other type of interaction that the third-party server 126 may conduct with the customer service system 108 on behalf of an individual such as a customer.

The local network 116 may include any type of computer networking arrangement used to exchange data in a localized area, such as WiFi, Bluetooth™ Ethernet, and other suitable network connections that enable components of the customer service system 108 to interact with one another and to connect to the network 106 for interacting with components in the system 100 environment. In some embodiments, the local network 116 may include an interface for communicating with or linking to the network 106.

In other embodiments, certain components of the customer service system 108 may communicate via the network 106 without a separate local network 116.

The response management system 120 may include one or more computer systems configured to compile data from a plurality of sources, such as the web server 110, the call center server 112, and the transaction server 114. The response management system 120 may correlate compiled data, analyze the compiled data, arrange the compiled data, generate derived data based on the compiled data, and store the compiled and derived data in a database such as the database 118. According to some embodiments, the database 118 may associated with the customer service system 108 and/or its related entity that stores a variety of information relating to customers, transactions, and business operations. The database 118 may also serve as a back-up storage device and may contain data and information that is also stored on, for example, databases 134, 144, 154, 164, 174 (and 280, as will be discussed with reference to FIG. 2). The database 118 may also store customer problems and responses to those problems. The database 118 may be accessed by the response management system 120 and may be used to store records of interaction, communication, and/or transaction a particular customer has had with the customer service system 108 and/or its related entity in the past to enable the creation of an ever-evolving customer context that may enable the response management system 120 to generate and provide a customized response to a customer based on interactions with the customer.

Figure 2:
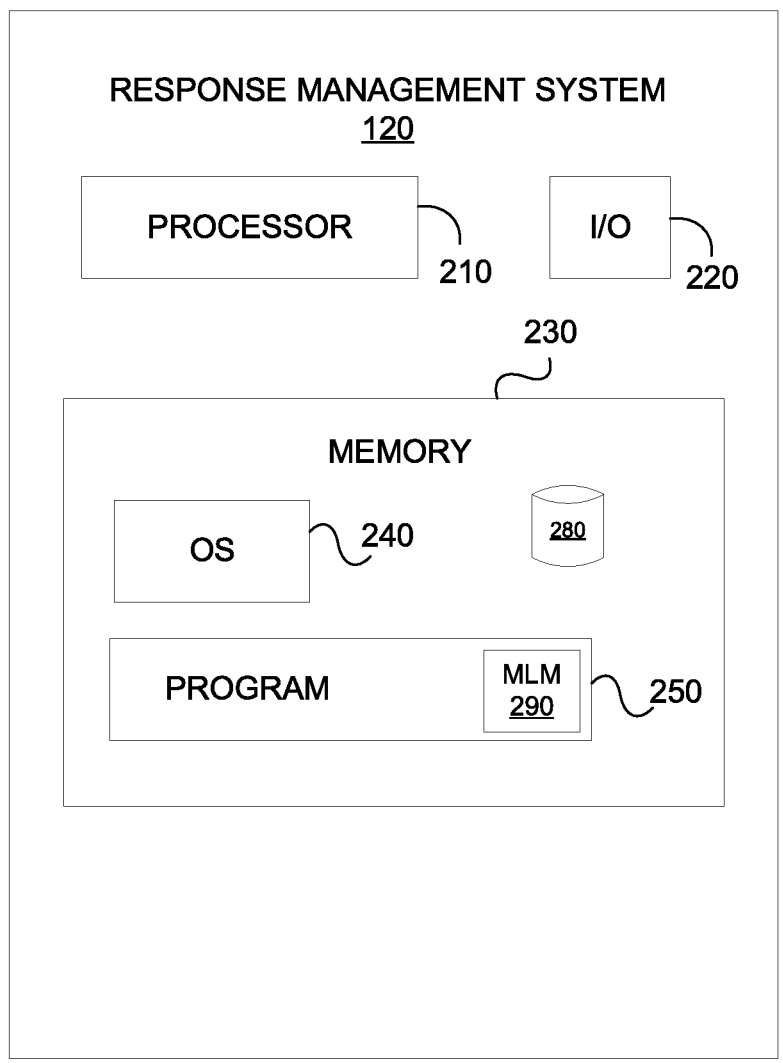
FIG. 2 is a block diagram of a response management system 120 within the example system 100, as shown in FIG. 1.

For example, as shown in more detail in FIG. 2, the response management system 120 may include a processor 210, an input/output ("I/O") device 220, a memory 230 containing an operating system ("OS") 240, a program 250, and a customer information database 280. In certain example implementations, the response management system 120 may be a single server or may be configured as a distributed computer system including multiple servers or computers that interoperate to perform one or more of the processes and functionalities associated with the disclosed embodiments. In some embodiments, the response management system 120 may further include a peripheral interface, a transceiver, a mobile network interface in communication with the processor 210, a bus configured to facilitate communication between the various components of the response management system 120, and a power source configured to power one or more components of the response management system 120. According to some embodiments, the user device 102, the web server 110, the call center server 112, the transaction server 114, the API server 122, the NLP device 124, as depicted in FIG. 1, may have a similar structure and components that are similar to those described with respect to response management system 120 shown in FIG. 2.

Returning to FIG. 1, the API server 122 may include a computer system configured to execute one or more application program interfaces (APIs) that provide various functionalities related to the operations of the customer service system 108. In some embodiments, the API server 122 may include API adapters that enable the API server 122 to interface with and utilize enterprise APIs maintained by the customer service system 108 and/or an associated entity that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. The API server 122 may include one or more processors 162 and one or more API databases 164, which may be any suitable repository of API data. Information stored in the API server 122 may be accessed (e.g., retrieved, updated, and added to) via the local network 116 (and/or network 106) by one or more devices/systems (e.g., response management system 120) of system 100. In some embodiments, the API processor 162 may be used to implement one or more APIs that can access, modify, and retrieve customer account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JavaScript Object Notation (JSON) serialized parameters in the body. Preferably, the requests with JSON serialized parameters use "application/json" content-type. In another aspect, an API design may also require the server implementing the API return messages in JSON format in response to the request calls from the client.

The natural language processing device (NLP device) 124 may include a computer system configured to receive and process incoming dialogue and determine a meaning of the incoming dialogue message. For example, the NLP device 124 may be configured to receive and execute a command containing an incoming dialogue message where the command instructs the NLP device 124 to determine the meaning of the incoming dialogue message. The NLP device 124 may be configured to continuously or intermittently listen for and receive commands from a command queue to determine if there are any new commands directed to the NLP device 124. Upon receiving and processing an incoming dialogue message, the NLP device 124 may output the meaning of an incoming dialogue message in a format that other devices can process. For example, the NLP device 124 may receive an incoming dialogue message stating "Hello, I would like to know my account balance please," and may determine that this statement represents a request for an account balance. The NLP device 124 may be configured to output the meaning of the incoming dialogue message for processing by another device. In some embodiments, the NLP device 124 may be configured to generate a natural language phrase in response to receiving a command. Accordingly, in some embodiments, the NLP device 124 may be configured to output an event that contains data representing natural language dialogue.

The NLP device 124 may have one or more processors 172 and one or more NLP databases 174, which may be any suitable repository of NLP data. Information stored in the NLP device 124 may be accessed (e.g., retrieved, updated, and added to) via the local network 116 (and/or network 106) by one or more devices (e.g., the response management system 120) of system 100. In some embodiments, the NLP processor 172 may be used to implement an NLP system that can determine the meaning behind a string of text and convert it to a form that can be understood by other devices.

Although the preceding description describes various functions of the web server 110, the call center server 112, the transaction server 114, the response management system 120, the database 118, the API server 122, and the natural language processing (NLP) device 124, in some embodiments, some or all of these functions may be carried out by a single computing device.

For ease of discussion, embodiments may be described in connection with the generation of automated natural language dialogue in response to an electronic text communication such as an SMS message, a chat program message, or an email. It is to be understood, however, that disclosed embodiments are not limited to dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with at least one communication protocol of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The response management system 120 may include one or more storage devices configured to store information used by the processor 210 (or other components) to perform certain functions related to the disclosed embodiments. In one example, the response management system 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other types of storage device or tangible computer-readable medium.

In one embodiment, the response management system 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the response management system 120 may include the memory 230 that may include one or more programs 250 to perform one or more functions of the disclosed embodiments. For example, in some embodiments, the response management system 120 may additionally manage dialogue and/or other interactions with the customer via a program 250. In some embodiments, the response management system 120 may include a trained machine learning model (MLM) 290 for generating zero or more commands in response to processing an event, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the trained machine learning model 290), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a customer information database 280 for storing related data to enable the response management system 120 to perform one or more of the processes and functionalities associated with the disclosed embodiments. The customer information database 280 may include stored data relating to a customer profile and customer accounts, such as for example, customer identification information (e.g., name, telephone number, social security number, age, sex, birthday, address, VIP status, key customer status, preferences, preferred language, vehicle(s) owned, greeting name, channel, talking points (e.g., favorite sports team, etc.), bank accounts, mortgage loan accounts, car loan accounts, other such accounts, account numbers, authorized users associated with one or more accounts, account balances, account payment history, and other such typical account information). The customer information database 280 may further include stored data relating to previous interactions between the customer service system 108 (or its related entity) and a customer. For example, the customer information database 280 may store customer interaction data that includes records of previous customer service interactions with a customer via a website, SMS, a chat program, a mobile application, an IVR system, or notations taken after speaking with a customer service agent. The customer information database 280 may also include information about business transactions between the customer service system 108 (or its related entity) and a customer that may be obtained from, for example, the transaction server 114. The customer information database 280 may also include customer feedback data such as an indication of whether an automated interaction with a customer was successful, online surveys filled out by a customer, surveys answered by a customer following previous interactions to the company, digital feedback provided through websites or mobile applications associated with the customer service system 108 or its related entity (e.g., selecting a smiley face or thumbs up to indicate approval), reviews written by a customer, complaint forms filled out by a customer, information obtained from verbal interactions with a customer (e.g., information derived from a transcript of a customer service call with a customer that is generated using, for example, voice recognition techniques) or any other types of communications from a customer to the customer service system 108 or its related entity. According to some embodiments, the functions provided by the customer information database may also be provided by a database that is external to the response management system 120, such as the database 118 as shown in FIG. 1.

The response management system 120 may also be communicatively connected to one or more memory devices (e.g., databases) locally or through a network. The remote memory devices may be configured to store information and may be accessed and/or managed by the response management system 120. By way of example, the remote memory devices may be document management systems, Microsoft™ SQL databases, SharePoint™ databases, Oracle™ databases, Sybase™ databases, or other relational or non-relational databases. Systems and methods consistent with disclosed embodiments, however, are not limited to separate databases or even to the use of a database.

The response management system 120 may also include one or more I/O devices 220 that may comprise one or more interfaces for receiving signals or input from devices and providing signals or output to one or more devices that allow data to be received and/or transmitted by the response management system 120. For example, the response management system 120 may include interface components, which may provide interfaces to one or more input devices, such as one or more keyboards, mouse devices, touch screens, track pads, trackballs, scroll wheels, digital cameras, microphones, sensors, and the like, that enable the response management system 120 to receive data from one or more users (such as, for example, via the user device 102).

In example embodiments of the disclosed technology, the response management system device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the response management system 120 has been described as one form for implementing the techniques described herein, other, functionally equivalent techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the response management system 120 may include a greater or lesser number of components than those illustrated.

According to some embodiments, the trained machine learning model 290 may be trained by updating a natural language processing device database 174 (as discussed above with respect to FIG. 1) with communications from customers that have been labeled using, for example, a web user interface. The data in the NLP database 174 may undergo supervised training in a neural network model using a neural network training algorithm while the model is offline before being deployed in the system 100. According to some embodiments, a NLP model of the system 100 may utilize deep learning models such as a convolutional neural network (CNN) that transforms a word into a word vector and long short-term memory (LS™) that transforms a sequence of word vectors into intent. The NLP model may also be trained to recognize named entities in addition to intents. For example, a named entity may include persons, places, organizations, account types, and product types. According to some embodiments, the response management system 120 may determine an entity that will execute a particular action, such as, for example, the API server 122, the NLP device 124, or some other device or component, such that only the determined type of entity may execute the particular action. According to some embodiments, the response management system 120 may also update the customer information database 280 (or alternatively, external database 118) with information about a previous or concurrent transaction or customer interaction.

Figure 3A:
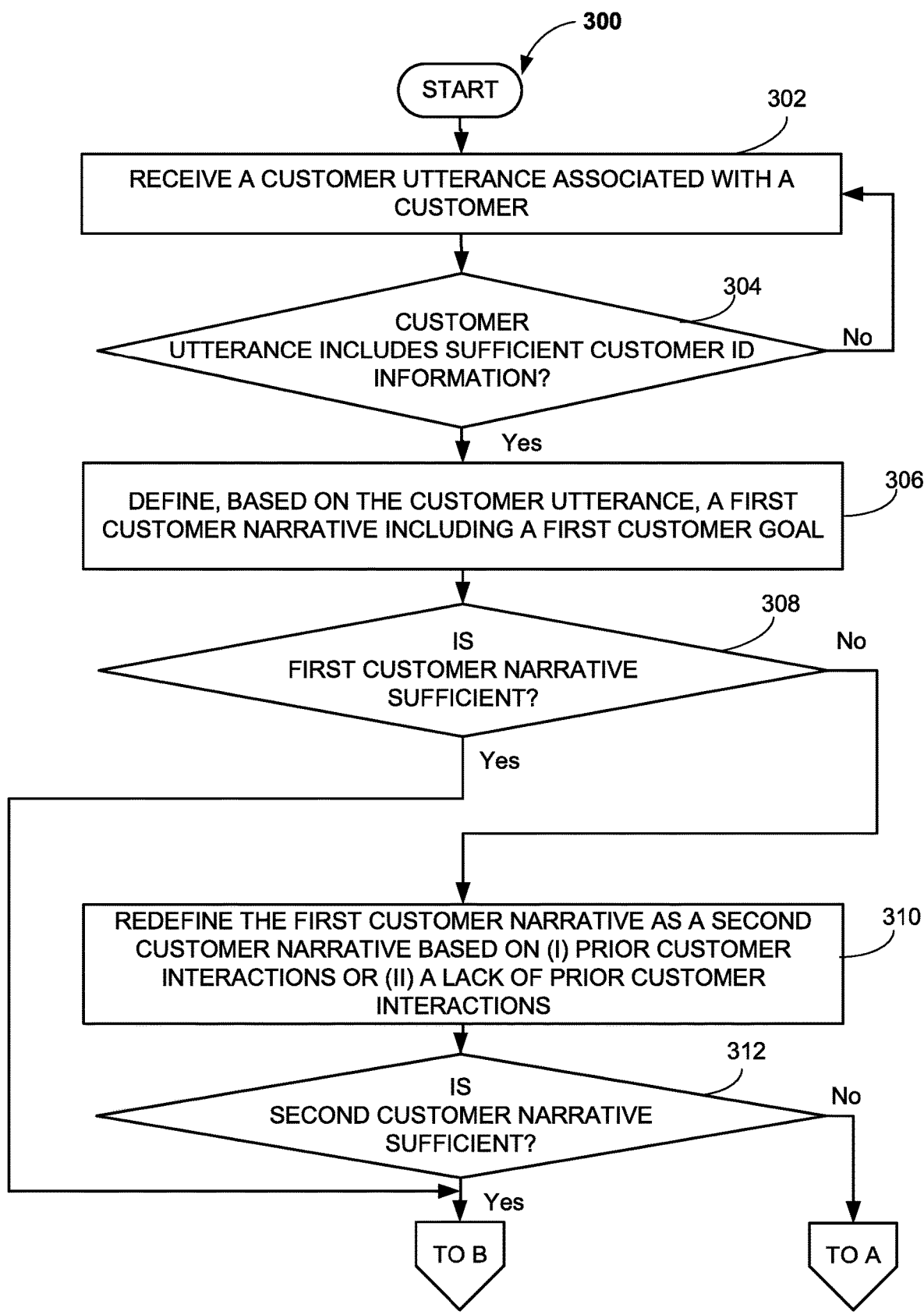
FIGS. 3A and 3B are flow charts of an example method for autonomously responding to customer problems, in accordance with an example implementation of the disclosed technology.
Figure 3B:
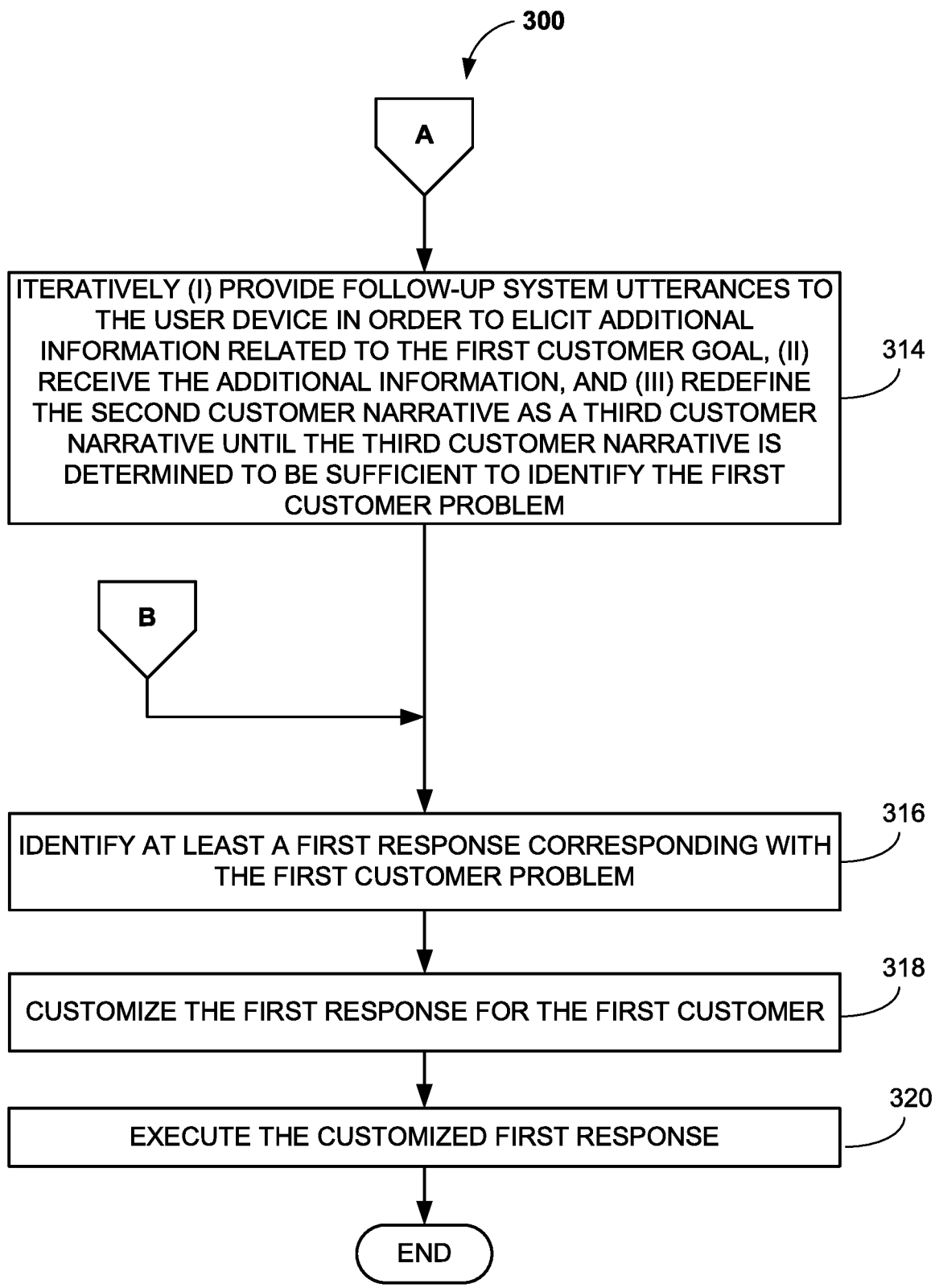

FIG. 3A is a flow chart of a first part of a method 300 for autonomously identifying and responding to customer problems, in accordance with an example implementation of the disclosed technology. FIG. 3B is a flow chart of a second part of the method 300 for autonomously identifying and responding to customer problems, in accordance with an example implementation of the disclosed technology. In certain example implementations one or more of the steps of the method 300 may be performed by the response management system 120 using processor 210 to execute memory 230. In some embodiments, steps of method 300 may be delegated to other components associated with the system 100. Following method 300, the system 100 may generate or execute a customized response to the user device 102.

As shown in block 302, the system (e.g., customer service system 108 and/or response management system 120) may receive (e.g., from the user device 102) a customer utterance associated with a customer (e.g., a customer associated with the user device 102). As discussed above, the customer utterance may be textual, audible, and/or video information.

As shown in block 304, the system (e.g., customer service system 108 and/or response management system 120) may determine whether the customer utterance includes sufficient customer identification information to identify the customer.

Although the customer identification information may include name, telephone number, social security number, age, sex, date of birth, address, VIP status, key customer status, preferences, preferred language, vehicle(s) owned, greeting name, channel, talking points (e.g., favorite sports team, etc.), bank accounts, mortgage loan accounts, car loan accounts, other such accounts, account numbers, authorized users associated with one or more accounts, account balances, account payment history, and other such typical account information, sufficient customer identification may include a customer's first name, last name, email, and date of birth. If the response management system 120 determines that the customer utterance does not include sufficient customer identification information (e.g., customer utterance does not include a first name, last name, email, and date of birth) (i.e., determination block 304=No), the response management system 120 may elicit additional information from the customer and return to block 302. For example, a customer may write that they need a bank loan application in a chat window of a chat program on a user device 102 (e.g., a smart phone). However, the customer may not provide their identifying information such as their first name, last name, email, and date of birth. In this scenario, the response management system 120 may elicit additional details from the customer by asking the customer for his first name, last name, email. and date of birth via the chat window. As another example, a customer may provide only some customer identification information such as the customer first name. In this scenario, the response management system 120 may elicit additional details from the customer by asking the customer for at least his last name, email, and birthdate because the identification information the customer provided is not sufficient.

If the response management system 120 determines that the customer utterance includes sufficient customer identification information (e.g., the customer utterance includes a first name, last name, email, and date of birth) (i.e., determination block 304=Yes), then the method 300 proceeds to block 306. For example, a customer may state in chat window that her name is Lucy Simmons with an email of lucy.simmons@some.domain, and a date of birth of Jun. 7, 1983. In this scenario, the response management system may not need any additional customer identification information.

As shown in block 306, the system (e.g., customer service system 108 and/or response management system 120) may define, based on the customer utterance, a first customer narrative including a first customer goal. The customer narrative may include summarized customer utterances, and the first customer goal may include any goal, such as wanting to return a product, obtain a car loan, and obtain a mortgage, that is recognized by and/or stored by the system. For example, a customer may type on their user device 102 connected to the network 106 "My name is Lucy Simmons. Did my loan application go through?" The system may converse back and state "I can help you with that." The customer may state "I'd like to purchase this Ferrari before someone else buys it." The customer narrative extracted from this may be translatable to "Lucy Simmons wants to verify the status of her submitted car loan application for a Ferrari. She needs the loan processed soon." While this customer narrative includes a customer goal of verifying the status of a car loan application, the customer narrative also includes additional information regarding the brand of car being purchased. Certain customer goals can go far beyond the system's ability to assist with but should still be represented in the customer narrative, understood, and reasoned about.

As shown in block 308, the system (e.g., customer service system 108 and/or response management system 120) may determine whether the first customer narrative is sufficient to identify a first customer problem. Put another way, the system (e.g., customer service system 108 and/or response management system 120) may determine whether the first customer narrative includes a first customer problem.

If the response management system 120 determines that the first customer narrative is sufficient to identify the first customer problem (i.e., determination block 308=Yes), then the method 300 moves to block 316. Put another way, if the response management system 120 determines that the first customer narrative includes the first customer problem (i.e., determination block 308=Yes), then the method 300 moves to block 316. For example, if a customer states that she wants to verify the status of her car loan, then one of her goals is to check the status of her car loan. The response management system 120 may identify a first customer problem including this goal. Thus, the first customer problem is that the customer needs an update on her loan status. If the response management system 120 determines that the first customer narrative is insufficient to identify the first customer problem (i.e., determination block 308=No), the method 300 moves to block 310. Put another way, if the response management system 120 determines that the first customer narrative does not include the first customer problem (i.e., determination block 308=No), the method 300 moves to block 310. For example, if a customer is irate and simply complains about a poorly run company, the customer narrative, in its current form, may not have a goal, making it impossible to identify a problem. In this scenario, the method 300 would move to block 310.

In block 310, responsive to determining that the first customer narrative is insufficient to identify the first customer problem (e.g., that the first customer narrative does not include the first customer problem), the system (e.g., customer service system 108 and/or response management system 120) may redefine the first customer narrative as a second customer narrative based on either (i) one or more prior customer interactions with the customer or (ii) a lack of prior customer interactions, each of the one or more prior customer interactions predating the customer utterance. For example, the response management system 120 may determine that the customer has previously called or used a chat window about checking the status of her car loan based on accessing database 118, which contains prior customer interaction records. In this scenario, the response management system 120 may redefine the first customer narrative as a second customer narrative which includes a customer goal (e.g., the goal of checking a car loan status) from the prior customer interaction information. Alternatively, there may be no prior interactions with the particular customer. In that scenario, the response management system 120 may simply redefine the first customer narrative as a second customer narrative without any prior customer interaction information.

As shown in block 312, the system (e.g., customer service system 108 and/or response management system 120) may determine whether the second customer narrative is sufficient to identify the first customer problem. Put another way, the system (e.g., customer service system 108 and/or response management system 120) may determine whether the second customer narrative includes the first customer problem. If the response management system 120 determines that the second customer narrative is sufficient to identify the first customer problem (i.e., determination block 312=Yes), then the method 300 moves to block 316. Put another way, if the response management system 120 determines that the second customer narrative includes the first customer problem (i.e., determination block 312=Yes), then the method 300 moves to block 316. For example, the second customer narrative may be updated with prior customer interaction, when compared with the first customer narrative, which may include a better defined first customer goal making it sufficient to identify the first customer problem. If the response management system 120 determines that the second customer narrative is insufficient to identify the first customer problem (i.e., determination block 312=No), then the method 300 moves to block 314. Put another way, if the response management system 120 determines that the second customer narrative does not include the first customer problem (i.e., determination block 312=No), the method 300 moves to block 314. For example, there may be no prior interactions making the second customer narrative equal to the first customer narrative. As another example, the prior interactions may not update or may not sufficiently update the first customer goal. In either of these scenarios, the response management system 120 determines that the second customer narrative including the first customer goal is insufficient to identify the first customer problem.

As shown in block 314, responsive to determining that the second customer narrative is insufficient (e.g., determining that the second customer narrative does not include the first customer problem), the system (e.g., customer service system 108 and/or response management system 120) may iteratively (i) provide follow-up system utterances to the customer in order to elicit additional information related to the first customer goal, (ii) receive the additional information, and (iii) redefine the second customer narrative as a third customer narrative based on the received additional information until the third customer narrative is determined to be sufficient to identify the first customer problem. For example, the response management system 120 may provide follow-up system utterances by simply asking the customer via a chat window "How may I help you?" In response to this utterance from the response management system 120, the customer may say, via the chat window, "I am interested in applying for a car loan." Thus, the follow-up system utterances elicited additional information (e.g., that the customer wants a car loan application). The response management system 120 may redefine the second customer narrative as the third customer narrative and may determine that the third customer narrative is sufficient based on the additional information (e.g., the customer wants a car loan application). If for some reason the additional information does not relate to the first customer goal, then the response management system will continue to provide follow-up system utterances to elicit even more additional information until the first customer goal is fleshed out enough that the third customer narrative is sufficient to identify the first customer problem.

In block 316, responsive to determining that at least one customer narrative of the first customer narrative, the second customer narrative, and the third customer narrative is sufficient (e.g., determining that the first customer narrative, second customer narrative, or the third customer narrative includes the first customer problem), the system (e.g., customer service system 108 and/or response management system 120) may identify at least a first response corresponding with the first customer problem. The response management system 120 may pair the plurality of problems with a plurality of responses. Thus, once the response management system 120 maps the first customer problem to the first problem, the response management system 120 can use the first problem to identify a first response. For example, if the customer wants to apply for a car loan, then the response may be to provide the user with a car loan application via email, via an online website, or via mail.

As shown in block 318, the system (e.g., customer service system 108 and/or response management system 120) may customize the first response for the customer based on at least one customer narrative of the first customer narrative, the second customer narrative, and the third customer narrative. The first customer narrative, the second customer narrative, and the third customer narrative may have additional context that may be used to customize the response. For example, if a customer wants to apply for a car loan, the response management system 120 may partially populate a car loan application for the customer based on information already provided by the customer during the current or prior customer interaction. Specifically, the response management system 120 may populate the car loan application with the make and model of the car to be purchased as well as the customer's identification information.

As shown in block 320, the system (e.g., customer service system 108 and/or response management system 120) may execute the customized first response. The response management system 120 may simply provide information to the customer. For example, if a customer wants to know the status of their car loan, the response management system 120 may simply provide the customer with a response that the loan application has been received and it is being processed via a chat window, via phone (e.g., the user device 102), or via a text message (e.g., via the user device 102). Alternatively, the response management system 120 may have to provide documents (e.g., home loan documents) to a customer who wants to apply to be preapproved. As another alternative, the execution may be to start an online home loan application for the customer and then direct the customer to continue filling out the online application.

Figure 4:
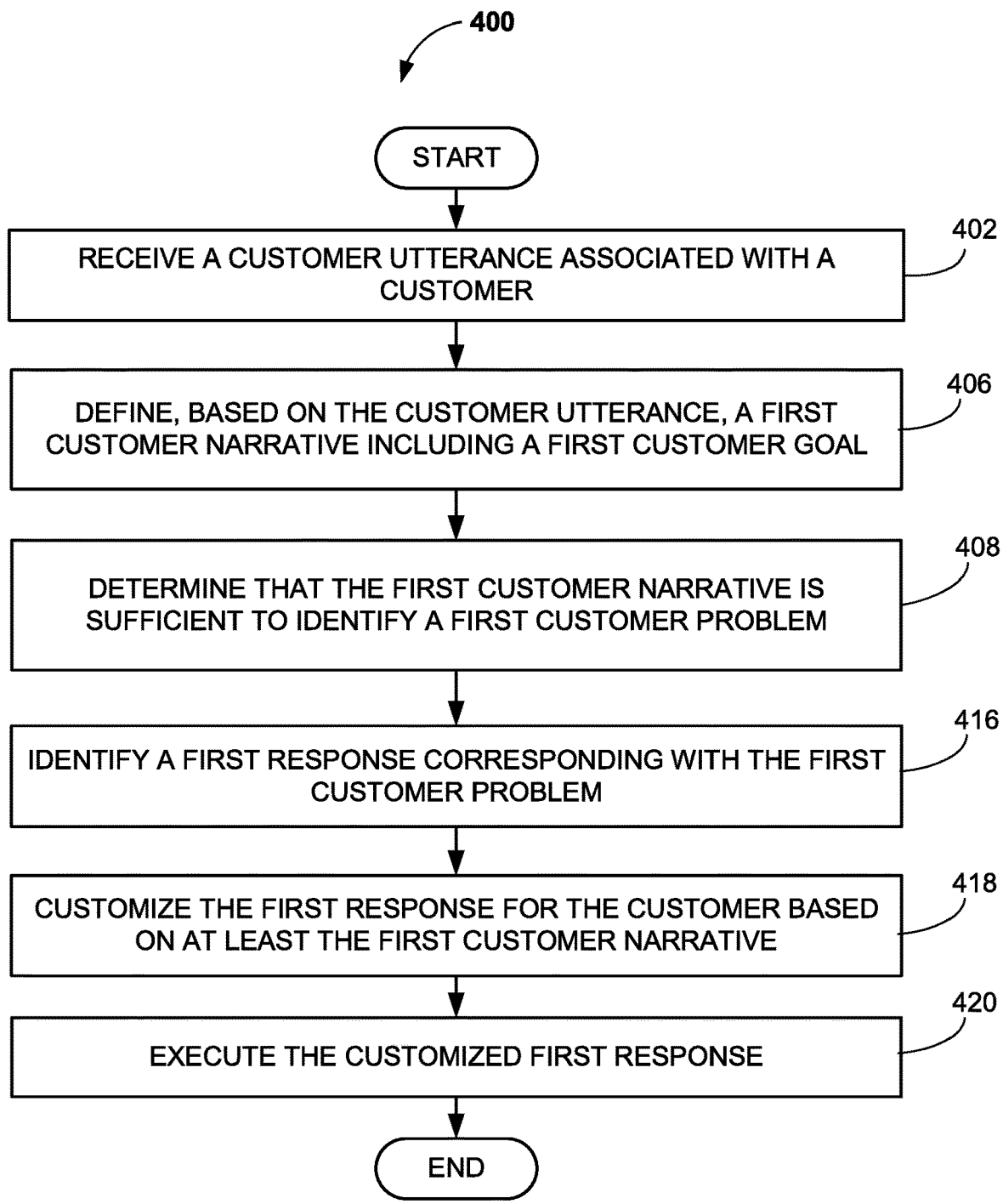
FIG. 4 is a flow chart of an example method for autonomously responding to customer problems, in accordance with an example implementation of the disclosed technology.

FIG. 4 is a flow chart of a method 400 for autonomously identifying and responding to customer problems, in accordance with an example implementation of the disclosed technology. In certain example implementations one or more of the steps of the method 400 may be performed by the response management system 120 using processor 210 to execute memory 230. In some embodiments, steps of method 400 may be delegated to other components associated with the system 100. Following method 400, the customer service system 108 may generate or execute a customized response to the user device 102.

Method 400 is similar to method 300 except that method 400 may not include blocks similar to blocks 304, 310, 312, and 314. Thus, method 400 may not include a determination for whether the customer utterance includes customer identification information, a redefining of the first customer narrative as a second customer narrative based on prior customer interactions or a lack of prior customer interactions, a determination of whether the second narrative is sufficient, or iteratively providing follow up system utterances to the user device in order to elicit additional information related to the customer. For brevity, the details of the similar aspects of method 300 will not be repeated. In block 402, the method 400 includes receiving a customer utterance associated with a customer. In block 406, the method 400 includes defining, based on the customer utterance, a first customer narrative including a first customer goal. In block

408, the method 400 includes determining that the first customer narrative is sufficient to identify a first customer problem. In other words, in block 408, the method includes determining that the first customer narrative includes a first customer problem. In block 416, the method 400 includes responsive to determining that the first customer narrative is sufficient (e.g., when the first customer narrative includes the first customer problem), identifying a first response corresponding with the first customer problem. In block 418, the method 400 includes customizing the first response for the customer based on at least the first customer narrative. In block 420, the method includes executing the customized first response.

Figure 5A:
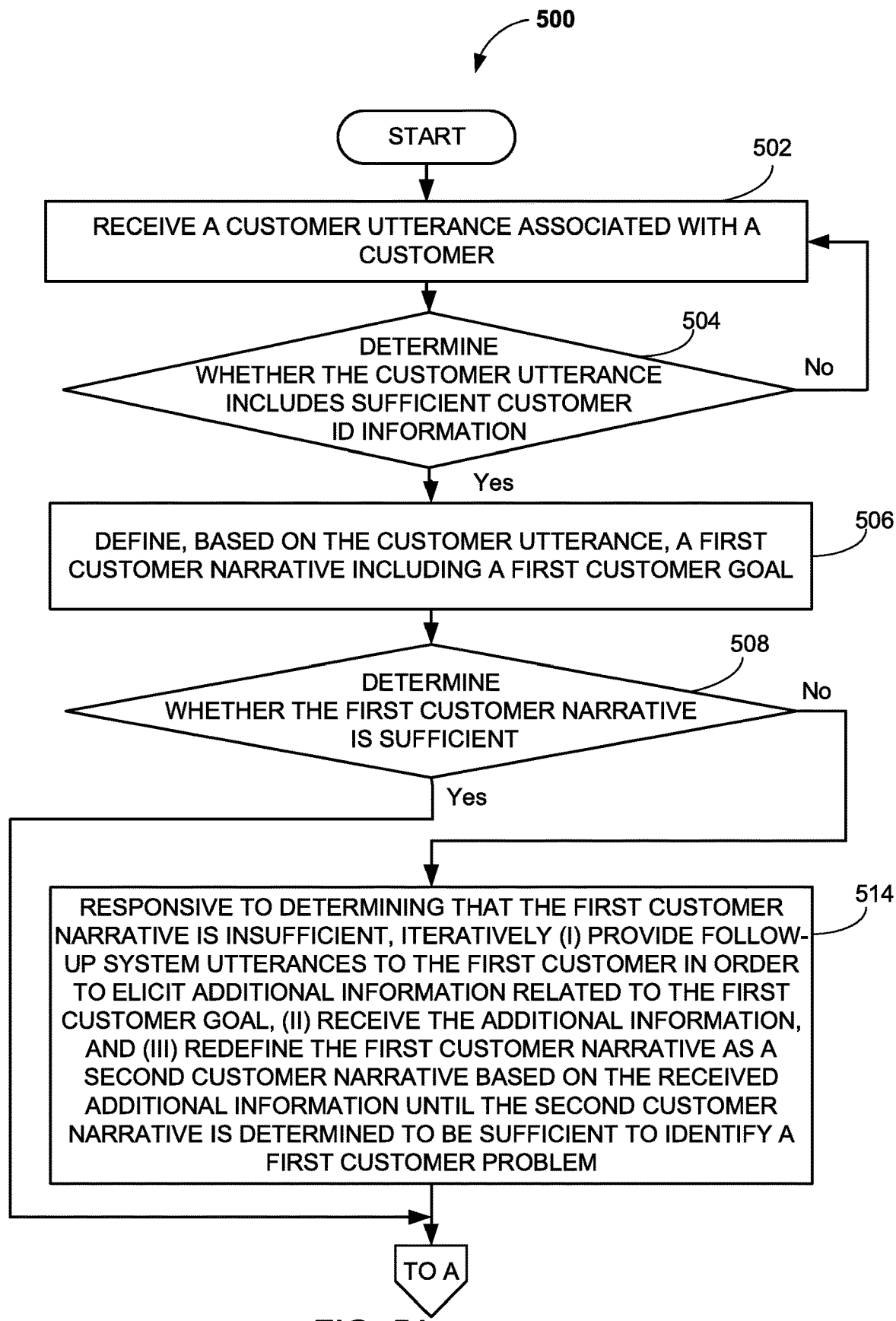
FIGS. 5A and 5B are flow charts of an example method for autonomously responding to customer problems, in accordance with an example implementation of the disclosed technology.
Figure 5B:
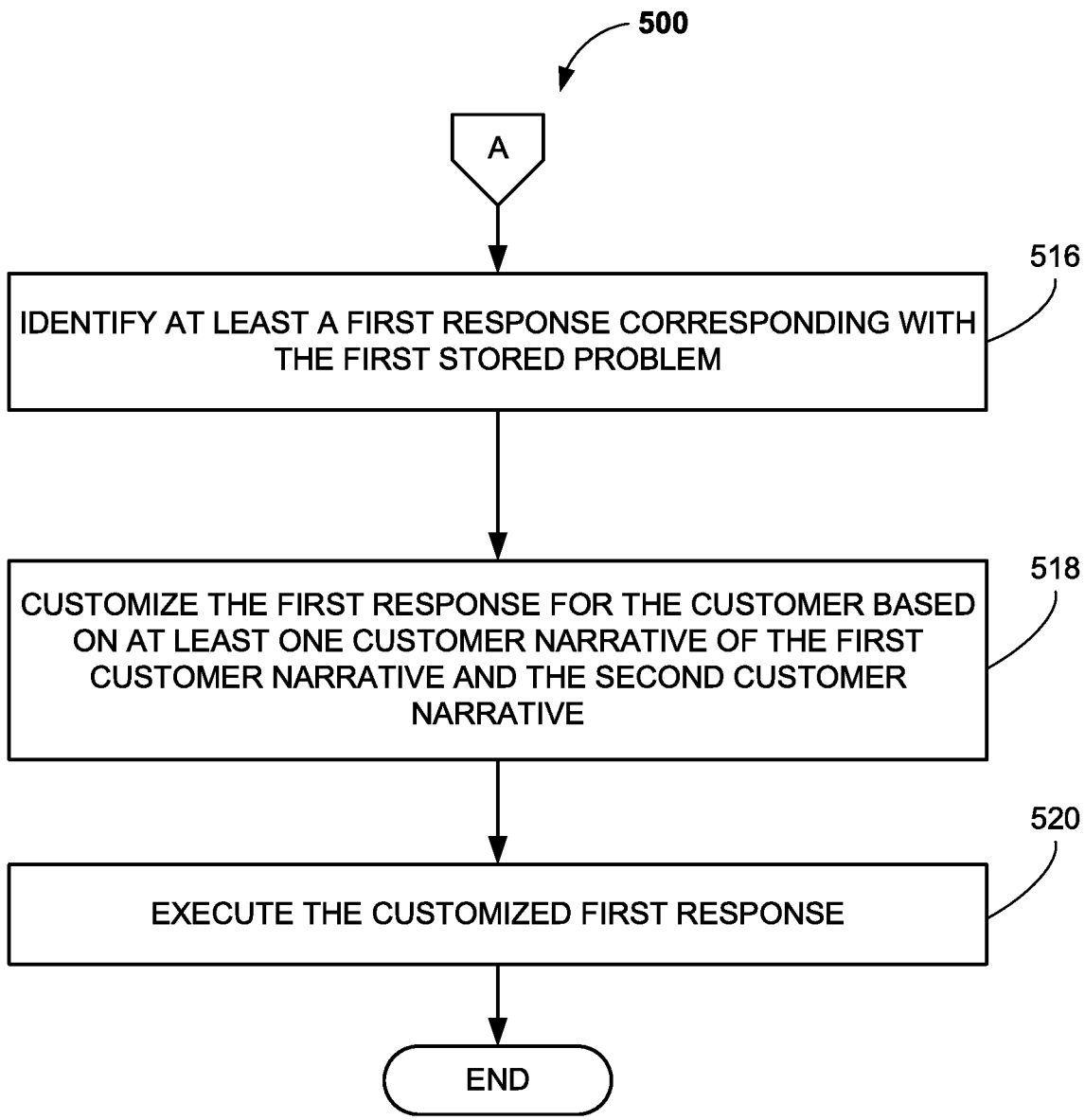

FIG. 5A is a flow chart of a first part of a method 500, for autonomously identifying and responding to customer problems, in accordance with an example implementation of the disclosed technology. FIG. 5B is a flow chart of a second part of a method 500, for autonomously identifying and responding to customer problems, in accordance with an example implementation of the disclosed technology. In certain example implementations, one or more of the steps of the method 500 may be performed by the response management system 120 using processor 210 to execute memory 230. In some embodiments, steps of method 500 may be delegated to other components associated with the system 100. Following method 500, the customer service system 108 may generate or execute a customized response to the user device 102.

Method 500 is similar to method 300 except that method 500 may not include blocks similar to blocks 310 and 312. Thus, method 500 may not include a check for prior customer interactions to help determine whether a customer narrative is sufficient. In addition, method 500 may not include a determination on whether a second customer narrative is sufficient. For brevity, the details of the similar aspects of method 300 will not be repeated. In block 502, the method 500 includes receiving a customer utterance associated with a customer. In block 504, the method 500 includes determining whether the customer utterance includes customer identification information. If the response management system 120 determines that the customer utterance does not include customer identification information (i.e., determination block 504=No), the response management system 120 may elicit additional information from the customer and move to block 502. If the response management system 120 determines that the customer utterance includes customer identification information (i.e., determination block 504=Yes), then the method 300 proceeds to block 506. In block 506, the method 500 includes defining, based on the customer utterance, a first customer narrative including a first customer goal. In block 508, the method includes determining whether the first customer narrative is sufficient to identify a first customer problem. In other words, the method includes determining whether the first customer narrative includes a first customer problem. If the response management system 120 determines that the first customer narrative is sufficient to identify the first customer problem (i.e., determination block 508=Yes), then the method 500 moves to block 516. Put another way, if the response management system 120 determines that the first customer narrative includes the first customer problem (i.e., determination block 508=Yes), then the method 500 moves to block 516. If the response management system determines that the first customer narrative is insufficient to identify the first customer problem (i.e., determination block 508=No), the method 500 moves to block 514. Put another way, if the response management system determines that the first customer narrative includes the first customer problem (i.e., determination block 508=No), the method 500 moves to block 514. In block 514, the method 500 includes responsive to determining that the second customer narrative is insufficient (e.g., determining that the second customer narrative does not include the first customer problem), iteratively (i) providing follow-up system utterances to the customer in order to elicit additional information related to the first customer goal, (ii) receiving the additional information, and (iii) redefining the first customer narrative as a second customer narrative based on the received additional information until the second customer narrative is determined to be sufficient to identify the first customer problem (e.g., until it is determined that the second customer narrative includes the first customer problem). In block 516, the method 500 includes responsive to determining that at least one customer narrative of the first customer narrative and the second customer narrative is sufficient (e.g., determining that the first customer narrative or the second customer narrative includes the first customer problem), identifying at least a first response corresponding with the first customer problem. In block 518, the method 500 includes customizing the first response for the customer based on at least one customer narrative of the first customer narrative and the second customer narrative. In block 520, the method 500 includes executing the customized first response.

Figure 6A:
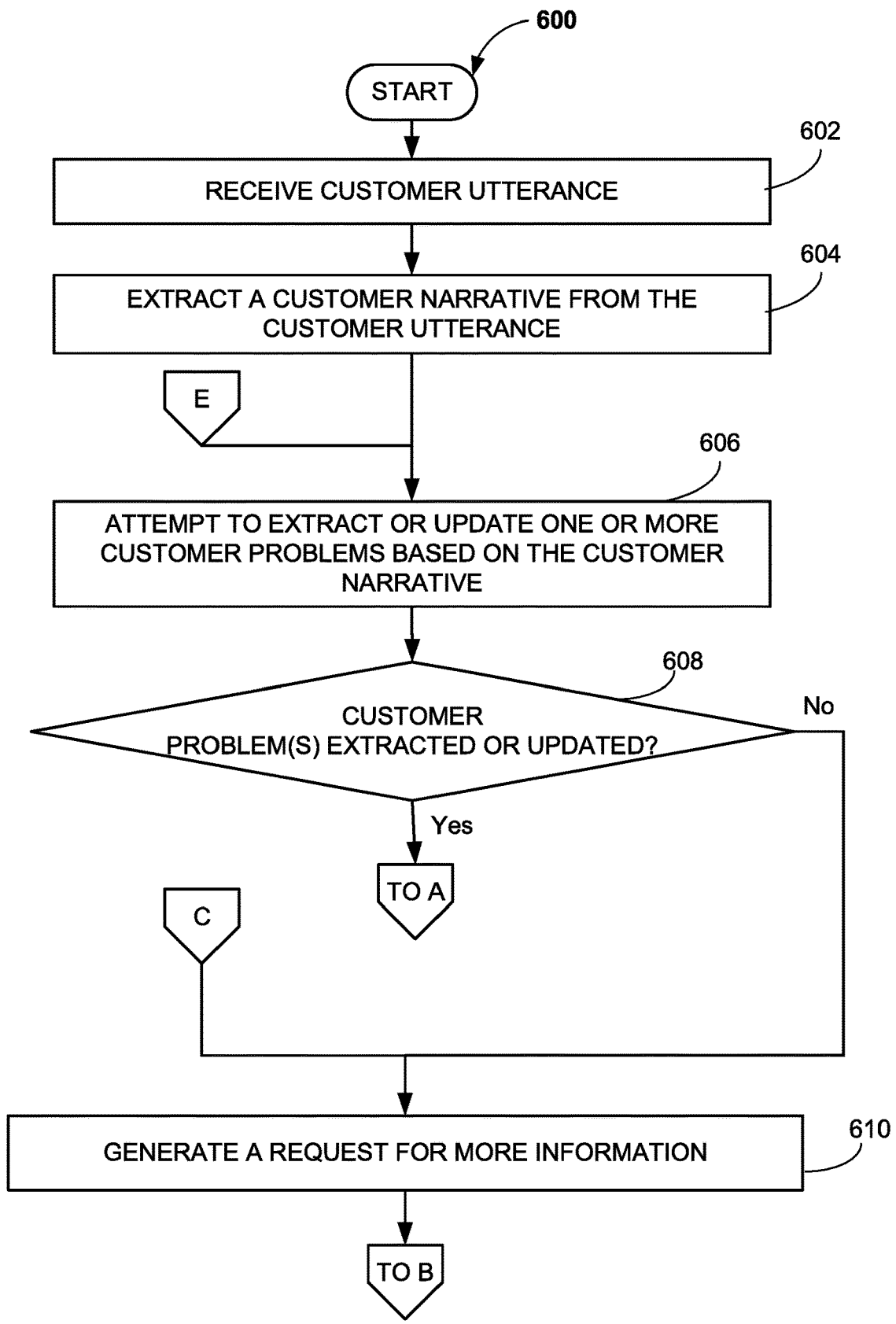
FIGS. 6A, 6B, and 6C are flow charts of an example method for autonomously responding to customer problems, in accordance with an example implementation of the disclosed technology.
Figure 6B:
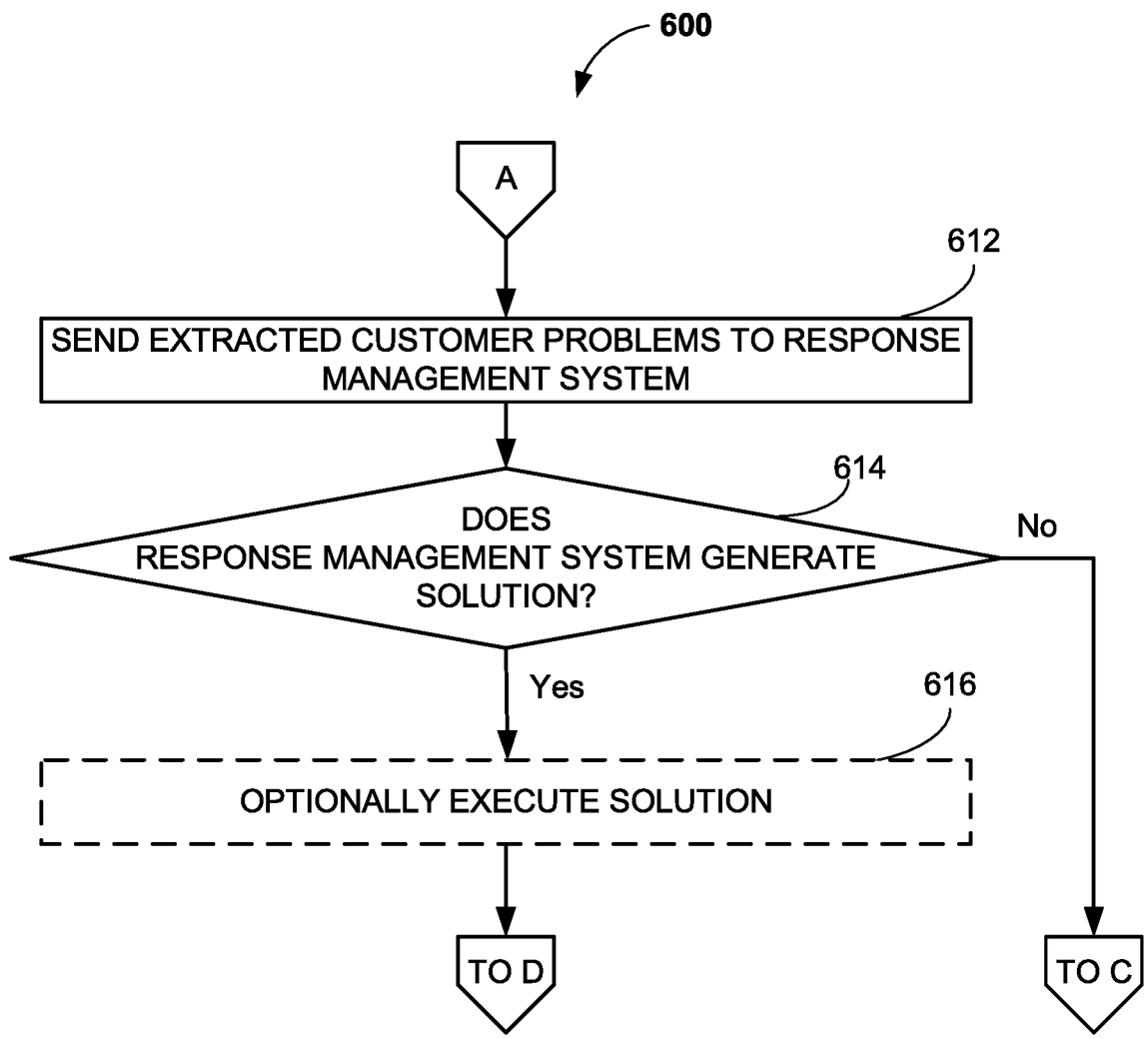
Figure 6C:
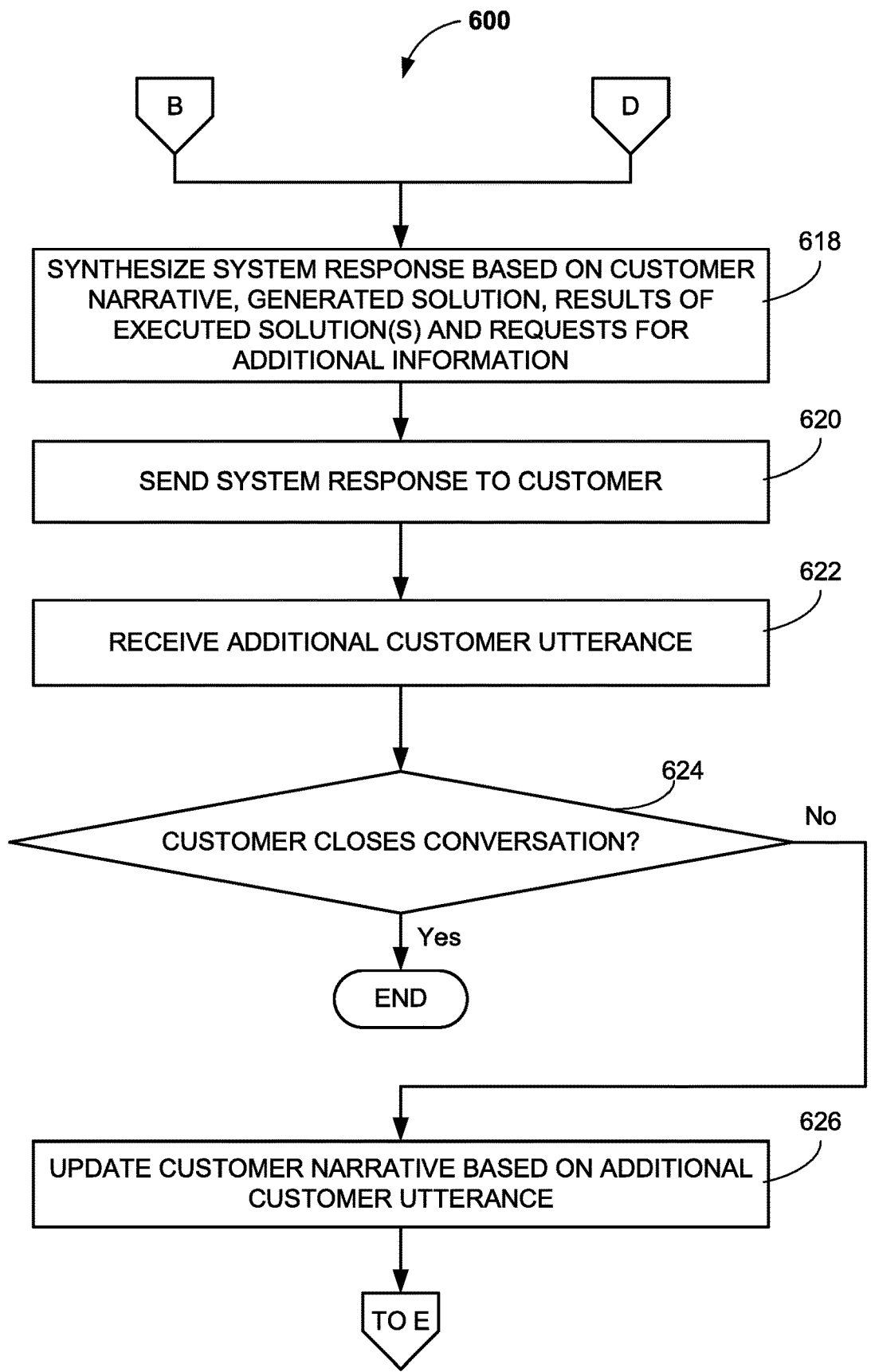

FIG. 6A is a flow chart of a first part of a method 600, for autonomously identifying and responding to customer problems, in accordance with an example implementation of the disclosed technology. FIG. 6B is a flow chart of a second part of the method 600, for autonomously identifying and responding to customer problems, in accordance with an example implementation of the disclosed technology. FIG. 6C is a flow chart of a third part of the method 600, for autonomously identifying and responding to customer problems, in accordance with an example implementation of the disclosed technology. In certain example implementations, one or more of the steps of the method 600 may be performed by the response management system 120 using processor 210 to execute memory 230. In some embodiments, steps of method 600 may be delegated to other components associated with the customer service system 108.

As shown in block 602, the customer service system 108 may receive a customer utterance and may extract a customer narrative from the customer utterance. Customer utterances may include (1) information pertaining to a customer goal identifiable by the system 101, which the customer service system 108 may fulfill or help fulfill, and (2) information that does not directly pertain to a goal that the customer service system 108 can help with (e.g., the customer can share a story about his/her childhood that doesn't include a goal identifiable by the customer service system 108).

In block 604, the customer service system 108 may extract a customer narrative from the customer utterance.

In block 606, the customer service system 108 may attempt to extract one or more customer problems from the customer narrative. The customer problem representation may include a current state of the customer and one or more customer goals. Certain types of information in the customer narrative may be identified as being part of the current state (e.g., current customer emotional state), while others could be identified as being part of the goal.

In block 608, the customer service system 108 may determine whether one or more customer problems were extracted from the customer narrative. Put another way, the customer service system 108 may determine whether the one or more customer problems are identified in the customer narrative. If the customer service system 108 extracts one or more customer problems from the customer narrative, the customer service system 108 may, in block 612, send the one or more customer problems to its response management system 120 (customer service system's 108 solver component). The response management system 120 may include one or more planners, constraint satisfaction solvers, case-based reasoning systems, and/or other modules. If one or more customer problems are not extracted from the customer narrative, then the customer service system 108 may generate a request for more information from the user device 102 associated with the customer in block 610.

In block 614, the customer service system 108 may determine whether the response management system 120 generated a solution to the one or more customer problem. If the response management system 120 generated one or more solutions to the one or more customer problems, the customer service system 108 may optionally execute the generated solution in optional block 616. If the response management system 120 fails to generate solutions to one or more of the customer problems, the customer service system 108 may generate a request for more information from the customer (block 610 in FIG. 6A).

In block 618, the customer service system 108 may synthesize a system response based on the customer narrative, generated solution(s), results of any executed solution (s), and any request(s) for additional information. In block 620, the customer service system 108 sends the system response to the user device 102 associated with the customer. In block 622, the customer service system 108 may receive an additional customer utterance.

In block 624, the customer service system 108 determines whether the customer wishes to close the conversation based in his or her indication in the additional customer utterance. In other words, the customer service system 108 determines whether the additional customer utterance includes a close conversation request (i.e., an indication that the customer wants to terminate the conversation with the customer service system 108 (e.g., simply stating "goodbye")). If the customer service system 108 determines that the customer utterance includes an indication that the customer wishes to close the conversation or if the customer has disconnected from the customer service system 108 without sending an additional utterance, the customer service system 108 terminates interaction with the user device 102 associated with the customer.

Otherwise, in block 626, the customer service system 108 may update the customer narrative based on the additional customer utterance. For example, the additional customer utterance might add to the customer narrative events, temporal ordering, causal links, and other components as more details of the customer narrative become available. After updating the customer narrative, in block 606 (in FIG. 6A), the customer service system 108 may attempt to extract one or more customer problems from the updated customer narrative, or to update one or more previously extracted customer problems based on the customer narrative. The process continues until the customer closes the conversation.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Use Case Example(s)

The following example use cases are intended solely for explanatory purposes, without limiting the scope of the disclosed technology.

In an example use case, a customer may have a question or request associated with an account they have with a customer service provider, which may be associated with a customer service system. For example, the customer may want to know information related their account, such as the account balance, due date for payment, specifics about a purchase, etc. In some instances, the customer may want to perform an action related to their account, such as making a payment, disputing a charge, etc. The customer may further wish to have a convenient and efficient way to pose their question or request account service without having to deal with the waiting times, inefficiencies and complexities that are often associated with customer service interactions involving call centers or interactive voice response systems. In this use case, the customer may prefer using text-based messaging as a form of communication for posing questions or requesting service associated with their account. However, voice-based communication (e.g., a telephone conversation) is also envisioned.

To allow access to the system using text-based interactions, the customer may click or tap to open a chat window on a website or mobile application. Optionally, the customer may login to the website or mobile app by providing a user name and password to the website or mobile application associated with the customer service system 108. However, the customer may login only after they have previously created a login account which includes customer identification information (e.g., name, telephone, birthdate), username, and password. Once the user clicks or taps to open a chat window the customer may begin typing discourse.

A customer may type "I'm getting married and thinking of buying a new house." into the chat window displayed on user device 102. The response management system 120 may first determine whether the dialogue includes sufficient customer identification to proceed. Since this customer did not have to login, which could have associated this customer with customer identification information, this customer's statement does not include any customer identification information. Thus, the response management system 120 may prompt the user for her customer identification information by sending the message "Congratulations! First, can you please provide your name, email, telephone number, and birthdate?" The customer may respond by typing in the chat window via the user device 102 "My name is Lucy Simmons, my email is lucy.simmons@some.domain, my telephone number is 804-555-4242, and my birthdate is Jun. 7, 1983." After receiving this incoming dialogue from the user device 102, the response management system 120 may determine that it has sufficient customer identification information because it has the first name, last name and birthdate, as well as the telephone number of the customer.

The response management system 120 then defines, based on the customer utterance, a first customer narrative. At this stage, the first customer narrative is that Lucy Simmons, who has an email of lucy.simmons@some.domain, a telephone number of 804-555-4242, and a birthdate of Jun. 7, 1983, is getting married soon and is thinking about buying a home. The first customer narrative includes a first customer goal (e.g., that the customer is thinking about buying a home).

The response management system 120 then determines whether this first customer narrative is sufficient to identify a first customer problem (e.g., does the first customer narrative correspond with or include a first customer problem). Here, the first customer goal is buying a home. However, customer service system 108 is not in the real estate business. Thus, the response management system 120 determines that the first customer narrative is not sufficient to identify the first customer problem.

In response to determining that the first customer narrative is insufficient, the response management system 120 checks for prior customer interactions with the customer to see if it can further define the first customer narrative as a second customer narrative based on the prior customer interactions. In this example, the response management system 120 determines that there are no prior interactions with this customer and simply redefines the first customer narrative as a second customer narrative based on the lack of prior customer interactions. Thus, the second customer narrative is also that Lucy Simmons, who has a telephone number is 804-555-4242 and a birthdate of Jun. 7, 1983, is getting married soon and is thinking about buying a home.

The response management system 120 then determines whether the second customer narrative is sufficient to identify a first customer problem. In this instance, because there were no prior customer interactions, the second customer narrative is essentially the same as the first customer narrative. Thus, the response management system 120 determines that the second customer narrative, like the first customer narrative, is not sufficient to identify the first customer problem (e.g., the second customer narrative does not correspond with or include the first customer problem).

In response to determining that the second customer narrative is insufficient (e.g., the second customer narrative does not correspond with or include the first customer problem), the response management system 120 iteratively provides follow-up dialogue messages or prompts to the customer. Here, the response management system 120 may ask via the chat window "What kind of house would you like?" In response to the follow-up dialogue prompt, the customer may type "As a child, I lived in a brick-wall house in the UK. I'd like a house that reminds me of my childhood home." The response management system 120 may then redefine the second customer narrative as a third customer narrative. Here, the third customer narrative is that Lucy Simmons, who has an email of lucy.simmons@some.domain, a telephone number of 804-555-4242, and a birthdate of Jun. 7, 1983, is getting married soon and is thinking about buying a home that reminds her of her childhood brick-wall home in the UK. The response management system 120 determines that the third customer narrative is not sufficient to identify a first customer problem (e.g., the third customer narrative does not correspond with or include the first customer problem) because the third customer narrative merely contains identifying information and a desire to buy a home that reminds Lucy of her childhood home and the third customer narrative does not contain a customer problem that the response management system 120 is capable of solving.

In response to determining that the third customer narrative is insufficient (e.g., the third customer narrative does not correspond with or include the first customer problem), the response management system 120 provides a follow-up dialogue message or prompt. Here, the response management system 120 may state via the chat window "Go on." In response to the follow-up dialogue message from the response management system 120, the customer may type "I hope to have a big family of my own because I've always had a very close relationship with my younger sister. I also need to get preapproval for a home loan, so I can make an offer on a house in the Washington D.C. metro area once I find the right one." The response management system 120 may then update the third customer narrative to include the latest iteration of the customer discourse. Here, the updated third customer narrative is that Lucy Simmons, who has an email of lucy.simmons@some.domain, a telephone number of 804-555-4242, and a birthdate of Jun. 7, 1983, is getting married soon, is thinking about buying a home that reminds her of her childhood brick-wall home in the UK, wants to have a big family because of her close relationship with her younger sister, and wants to ger preapproval for a home loan so she can be ready to purchase a house in the Washington D.C. metro area once she finds the right one. The response management system 120 determines that the updated third customer narrative is sufficient to identify a first customer problem (e.g., the updated third customer narrative corresponds with or includes the first customer problem). Here, the first customer problem is that the customer needs preapproval to purchase a house. The response management system 120 may also reason that Lucy may need a large home loan since Lucy wants a big family.

In response to determining that the updated third customer narrative is sufficient (e.g., that the first customer narrative corresponds with or includes the first customer problem), the response management system 120 identifies at least a first response. Here, the first response may be a shortened loan application to obtain preapproval. The response management system 120 may customize the first response based on the updated third customer narrative. Here, the response management system 120 may customize the preapproval application to include the customer's name, email, birthdate, and telephone number (all found in the updated third customer narrative). In addition, the response management system 120 may customize the preapproval application to include a suggested large loan amount based on Lucy's desire to have a big family. To determine the suggested large loan amount to be placed with the preapproval application, the response management system 120 may search online (e.g., via multiple listing service (MLS), Zillow, or Redfin) for the average price for a five-bedroom house in the Washington D.C. metro area. The response management system 120 may determine that the average price for a five-bedroom house is $600,000 and give Lucy a 5% buffer. The response management system 120 may assume that Lucy will put at least 10% down meaning that the response management system 120 suggests a preapproval amount of $567,200 ($630,000 minus 10% down payment ($63,000)). The response management system 120 may then execute the customized first response by sending the prefilled preapproval application that includes the customer's name, email, birthdate, telephone number, and suggested preapproval amount to Lucy Simmons via email (found in the updated third customer narrative). Alternatively, the response management system 120 may provide Lucy Simmons a link to an online version of a prefilled preapproval application in the chat window. Alternatively, the response management system 120 may email Lucy Simmons a link to an online prefilled preapproval application.

What is claimed is:

1. A system for autonomously identifying and responding to customer problems, the system comprising:
one or more processors; and
memory in communication with the one or more processors and storing instructions that, when executed by the one or more processors, are configured to cause the system to:
receive a customer utterance associated with a customer;
determine whether the customer utterance is sufficient to identify a first customer problem;
responsive to determining that the customer utterance is insufficient to identify the first customer problem:
retrieve one or more prior customer interactions with the customer, each of the one or more prior customer interactions predating the customer utterance;
determine whether the customer utterance and the one or more prior customer interactions are sufficient to identify the first customer problem; and
responsive to determining that the customer utterance and the one or more prior customer interactions are insufficient, (i) provide a follow-up system utterance to the customer in order to elicit additional information related to the first customer problem and (ii) receive the additional information;
responsive to determining that (i) the customer utterance, (ii) the customer utterance and the one or more prior customer interactions, or (iii) the customer utterance, the one or more prior customer interactions, and the additional information is sufficient to identify the first customer problem, identify at least a first response corresponding with the first customer problem;
customize the first response for the customer based on the customer utterance; and
execute the customized first response.

2. The system of claim 1, wherein:
the first customer problem comprises obtaining a loan; and
executing the first response comprises providing a loan application associated with a first item for display on a user device associated with the customer.

3. The system of claim 1, further comprising instructions that, when executed by the one or more processors, are configured to cause the system to:
determine an error associated with executing the first response;
identify at least a second response corresponding with the first customer problem; and
execute the second response.

4. The system of claim 1, further comprising instructions that, when executed by the one or more processors, are configured to cause the system to:
identify a second response corresponding with the first customer problem; and
execute the second response.

5. The system of claim 4, wherein the first customer problem comprises obtaining a loan.

6. The system of claim 4, wherein:
executing the first response comprises providing the customer with a personal loan application; and
executing the second response comprises providing the customer with a home loan application.

7. The system of claim 1, wherein:
the first customer problem comprises wanting improved spending habits; and
executing the first response comprises (i) analyzing one or more spending habits of the customer, (ii) determining one or more improvement recommendations, and (iii) providing the one or more improvement recommendations to the customer.

8. A system for autonomously identifying and responding to customer problems, the system comprising:
one or more processors; and
memory in communication with the one or more processors and storing instructions that, when executed by the one or more processors, are configured to cause the system to:
receive a customer utterance associated with a customer;
determine whether the customer utterance is sufficient to identify a first customer problem;
responsive to determining that the customer utterance is sufficient to identify the first customer problem, identify a first response corresponding with the first customer problem;
customize the first response for the customer based on at least the customer utterance; and
execute the customized first response.

9. The system of claim 8, further comprising instructions that, when executed by the one or more processors, are configured to cause the system to:
responsive to determining that the customer utterance is insufficient to identify the first customer problem:
retrieve one or more prior customer interactions with the customer, each of the one or more prior customer interactions predating the customer utterance; and
determine whether the customer utterance and the one or more prior customer interactions are sufficient to identify the first customer problem.

10. The system of claim 9, further comprising instructions that, when executed by the one or more processors, are configured to cause the system to:
responsive to determining that the customer utterance and the one or more prior customer interactions are insufficient to identify the first customer problem, (i) provide follow-up system utterances to the customer in order to elicit additional information related to the first customer problem and (ii) receive the additional information; and
responsive to determining that (i) the customer utterance and the one or more prior customer interactions or (ii) the customer utterance, the one or more prior customer interactions, and the additional information are sufficient to identify the first customer problem, identifying the first response corresponding with the first customer problem.

11. The system of claim 9, wherein:
the first customer problem comprises obtaining a loan; and executing the first response comprises providing the customer with a loan application associated with a first item.

12. The system of claim 9, wherein the one or more prior customer interactions comprise an indication that the customer was previously denied a loan.

13. The system of claim 9, further comprising instructions that, when executed by the one or more processors, are configured to cause the system to:
determine an error associated with executing the first response;
identify at least a second response; and
execute the second response.

14. The system of claim 11, further comprising instructions that, when executed by the one or more processors, are configured to cause the system to:
identify a second response corresponding with the first customer problem; and
execute the second response.

15. The system of claim 14, wherein:
executing the first response comprises providing the customer with a personal loan application; and
executing the second response comprises providing the customer with a home loan application.

16. A system for autonomously identifying and responding to customer problems, the system comprising:
one or more processors; and
memory in communication with the one or more processors and storing instructions that, when executed by the one or more processors, are configured to cause the system to:
receive a customer utterance associated with a customer from a user device;
determine whether the customer utterance corresponds with a first customer problem;
responsive to determining that the customer utterance does not correspond with the first customer problem, (i) provide follow-up system utterances to the user device in order to elicit additional information related to the first customer problem and (ii) receive the additional information;
responsive to determining that (i) the customer utterance or (ii) the customer utterance and the additional information corresponds with the first customer problem:
identify at least a first response corresponding with the first customer problem;
customize the first response for the customer based on the customer utterance, the additional information, or both; and
execute the customized first response.

17. The system of claim 16, further comprising instructions that, when executed by the one or more processors, are configured to cause the system to:
determine an error associated with executing the first response;
identify at least a second response corresponding with the first customer problem; and
execute the second response.

18. The system of claim 16, further comprising instructions that, when executed by the one or more processors, are configured to cause the system to:
identify a second response corresponding with the first customer problem; and
execute the second response.

19. The system of claim 17, wherein:
executing the first response comprises providing the customer with a personal loan application; and
executing the second response comprises providing the customer with a home loan application.

20. The system of claim 16, wherein:
the first customer problem comprises obtaining a loan; and
executing the first response comprises providing the customer with a loan application associated with a first item.

21. A system for autonomously identifying and responding to customer problems, the system comprising:
one or more processors; and
memory in communication with the one or more processors and storing instructions that, when executed by the one or more processors, are configured to cause the system to:
receive one or more customer utterances from a user device associated with a customer;
extract a customer narrative from the one or more customer utterances;
extract one or more customer problems from the customer narrative;
generate a first solution to the one or more customer problems;
execute the first solution;
synthesize a first system response based on the customer narrative, the first solution, and result of the executed first solution;
send the first system response to the user device;
receive a first additional customer utterance from the user device;
determine whether the first additional customer utterance comprises a close conversation request or whether the user device has disconnected from the system;
responsive to determining that the first additional customer utterance comprises the close conversation request or that the user device has disconnected from the system, terminate interaction with the user device; and
responsive to determining that the first additional customer utterance does not comprise the close conversation request and has not disconnected from the system,
update the customer narrative based on the first additional customer utterance.

22. The system of claim 21, further comprising instructions that, when executed by the one or more processors, are configured to cause the system to:
attempt to extract the one or more customer problems from the updated customer narrative;
determine whether one or more customer problems were extracted from the updated customer narrative;
responsive to determining that the one or more customer problems were not extracted or updated from the updated customer narrative, generate a request for more information from the user device associated with the customer; and
responsive to determining that the one or more customer problems were extracted from the updated customer narrative:
generate a second solution to the one or more customer problems;
execute the second solution;
synthesize a second system response based on the customer narrative, the generated second solution, results of the executed second solution, and the request for more information; and send the second system response to the user device;

receive a second customer utterance from the user device; and determine that the second customer utterance comprises the close conversation request.

* * * * *